United States Patent
Son

(10) Patent No.: US 11,163,516 B2
(45) Date of Patent: Nov. 2, 2021

(54) ELECTRONIC APPARATUS, DISPLAY APPARATUS, AND MULTIVISION SETTING METHOD

(71) Applicant: SAMSUNG ELECTRONICS CO., LTD., Suwon-si (KR)

(72) Inventor: Yong-Hun Son, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/762,403

(22) PCT Filed: Oct. 18, 2018

(86) PCT No.: PCT/KR2018/012360
§ 371 (c)(1),
(2) Date: May 7, 2020

(87) PCT Pub. No.: WO2019/093676
PCT Pub. Date: May 16, 2019

(65) Prior Publication Data
US 2020/0348898 A1  Nov. 5, 2020

(30) Foreign Application Priority Data
Nov. 9, 2017 (KR) .................. 10-2017-0148989

(51) Int. Cl.
*G06F 3/14* (2006.01)
*G09G 3/20* (2006.01)

(52) U.S. Cl.
CPC ............. *G06F 3/1446* (2013.01); *G09G 3/20* (2013.01); *G09G 2300/026* (2013.01);
(Continued)

(58) Field of Classification Search
CPC .. G06F 3/1446; G09G 3/20; G09G 2300/026; G09G 2320/0686; G09G 2340/0442; G09G 2356/00
See application file for complete search history.

(56) References Cited

U.S. PATENT DOCUMENTS 7,843,401 B2 * 11/2010 Morikawa ............. G06F 3/1446
345/4
8,988,343 B2 * 3/2015 Fei .......................... G06F 3/012
345/156
(Continued)

FOREIGN PATENT DOCUMENTS

KR  10-2013-0124101 A  11/2013
KR  10-2014-0126606 A  10/2014
(Continued)

OTHER PUBLICATIONS

Communication (PCT/ISA/210) dated Feb. 20, 2019 by the International Searching Authority in counterpart International Patent Application No. PCT/KR2018/012360.
(Continued)

*Primary Examiner* — Gene W Lee
(74) *Attorney, Agent, or Firm* — Sughrue Mion, PLLC

(57) ABSTRACT

An electronic apparatus may include an image processor configured to recognize each of IDs displayed on a plurality of display apparatuses in an image in which the plurality of display apparatuses displaying the respective IDs are captured and determine an array of the plurality of display apparatuses, and to determine positions of the plurality of display apparatuses based on the recognized respective IDs and the determined array of the plurality of display apparatuses; and a setter configured to generate video wall setting information for each of the plurality of display apparatuses based on the determined positions of the plurality of display apparatuses.

14 Claims, 23 Drawing Sheets

(52) U.S. Cl.
CPC ............... *G09G 2320/0686* (2013.01); *G09G 2340/0442* (2013.01); *G09G 2356/00* (2013.01)

(56) References Cited

U.S. PATENT DOCUMENTS

| | | | | |
|---|---|---|---|---|
| 9,794,510 | B1* | 10/2017 | Jo | G06F 3/1446 |
| 10,108,387 | B2* | 10/2018 | Poornachandran | H04N 5/23229 |
| 10,120,635 | B2* | 11/2018 | Yoganandan | G06F 3/0482 |
| 10,365,879 | B2* | 7/2019 | Lee | G06K 9/00664 |
| 10,390,076 | B2* | 8/2019 | Yoshida | G06F 3/1446 |
| 10,607,571 | B2* | 3/2020 | Utsch | G06F 3/1446 |
| 2010/0052548 | A1* | 3/2010 | Allard | G09G 3/3413 315/154 |
| 2010/0259474 | A1* | 10/2010 | Hildreth | G06F 3/0304 345/156 |
| 2014/0193037 | A1* | 7/2014 | Stitzinger | G09G 5/12 382/103 |
| 2015/0178036 | A1* | 6/2015 | Kawahara | H04N 21/4858 348/383 |
| 2015/0279037 | A1* | 10/2015 | Griffin | G09G 5/006 345/1.3 |
| 2016/0231975 | A1 | 8/2016 | Kim et al. | |
| 2017/0337028 | A1* | 11/2017 | Fan | G06F 3/0346 |
| 2018/0024800 | A1* | 1/2018 | Aghababyan | G09G 5/14 345/1.3 |
| 2019/0026061 | A1* | 1/2019 | Wang | G09G 5/006 |
| 2019/0102135 | A1* | 4/2019 | Lai | G06K 7/1413 |
| 2020/0133615 | A1* | 4/2020 | Kim | G06F 3/04847 |
| 2020/0241828 | A1* | 7/2020 | Noyelle | G06F 3/1446 |

FOREIGN PATENT DOCUMENTS

| | | |
|---|---|---|
| KR | 10-2015-0000783 A | 1/2015 |
| KR | 10-2015-0114810 A | 10/2015 |

OTHER PUBLICATIONS

Communication (PCT/ISA/237) dated Feb. 20, 2019 by the International Searching Authority in counterpart International Patent Application No. PCT/KR2018/012360.

* cited by examiner

FIG. 7

| EDGE PATTERN | NUMBER | ENTIRE / PARTIAL |
|---|---|---|
| ⌐ ¬<br>⌊ ⌋ | RECOGNIZE ALL ○ | ENTIRE IMAGE |
| , | RECOGNIZE ANY X | PARTIAL IMAGE |

FIG. 8

| BOUNDARY PATTERN | NUMBER | ARRAY |
|---|---|---|
| ⊥ | $n_1$ | $n_1 = n_2 = n$ →NUMBER OF ROWS : n+1 |
| ⊤ | $n_2$ | $n_1 \neq n_2$ →GENERATE ERROR CODE |
| ⊢ | $m_1$ | $m_1 = m_2 = m$ →NUMBER OF COLUMNS : m+1 |
| ⊣ | $m_2$ | $m_1 \neq m_2$ →GENERATE ERROR CODE |

FIG. 10

| RECOGNIZED EDGE PATTERN | RECOGNIZED BOUNDARY PATTERN | ARRAY |
|---|---|---|
| ⌋ | ⊣ : $n_2$ | $n_2 \times m_2$ |
|   | ⊥ : $m_2$ |   |
| ⌞ | ⊢ : $n_1$ | $n_1 \times m_2$ |
|   | ⊥ : $m_2$ |   |
| ⌜ | ⊢ : $n_1$ | $n_1 \times m_1$ |
|   | ⊤ : $m_1$ |   |
| ⌝ | ⊣ : $n_2$ | $n_2 \times m_1$ |
|   | ⊤ : $m_1$ |   |
| ⌜ , ⌝ | ⊢ : $n_1$ | $n_1 = n_2 = n$ → $n \times (m_1 + 1)$ |
|   | ⊣ : $n_2$ |   |
|   | ⊤ : $m_1$ | $n_1 \neq n_2$ → GENERATE ERROR CODE |
| ⌞ , ⌟ | ⊢ : $n_1$ | $n_1 = n_2 = n$ → $n \times (m_2 + 1)$ |
|   | ⊣ : $n_2$ |   |
|   | ⊥ : $m_2$ | $n_1 \neq n_2$ → GENERATE ERROR CODE |

ELECTRONIC APPARATUS, DISPLAY APPARATUS, AND MULTIVISION SETTING METHOD

CROSS REFERENCE TO RELATED APPLICATIONS

This application is a National Stage of International Application No. PCT/KR2018/012360 filed Oct. 18, 2018 claiming priority from Korean Patent Application No. 10-2017-0148989 filed on Nov. 9, 2017 and the disclosures of which are incorporated herein in their entirety by reference.

TECHNICAL FIELD

The present disclosure relates to an electronic apparatus for performing a video wall setting of a multivision system, a display apparatus included in the multivision system, and a multivision setting method.

BACKGROUND ART

A multivision system is a system that displays one image by combining a plurality of display apparatuses, also referred to as a video wall system.

The multivision system may display one source image by dividing the one source image into a plurality of images and outputting the divided plurality of images through the plurality of display apparatuses, respectively.

In order for the images displayed on the plurality of display apparatuses that are physically separate apparatuses to form the one image, each of the display apparatuses must appropriately output the divided image assigned to each of the display apparatuses based on its position in the multivision system. To this end, a setting operation for configuring a video wall on each of the display apparatuses must be performed.

DISCLOSURE

Technical Problem

The present disclosure provides an electronic apparatus capable of reducing a user's work load and work time by analyzing a captured image and generating video wall setting information required to operate each of display apparatuses in a video wall mode when a plurality of the display apparatuses included in a multivision system is captured, and automatically inputting the video wall setting information to each of the display apparatuses. Also, the present disclosure provides the display apparatus and a multivision setting method.

Technical Solution

An aspect of the disclosure provides an electronic apparatus including: an image processor configured to recognize each of IDs displayed on a plurality of display apparatuses in an image in which the plurality of display apparatuses displaying the respective IDs are captured and determine an array of the plurality of display apparatuses, and to determine positions of the plurality of display apparatuses based on the recognized respective IDs and the determined array of the plurality of display apparatuses; and a setter configured to generate video wall setting information for each of the plurality of display apparatuses based on the determined positions of the plurality of display apparatuses.

The image processor may be configured to determine an array of a multivision system including the plurality of display apparatuses based on the determined array of the plurality of display apparatuses.

When the captured image is an entire image including all of the plurality of display apparatuses constituting the multivision system, the image processor may be configured to determine the array of the plurality of display apparatuses as the array of the multivision system.

When the captured image is a partial image including a part of the plurality of display apparatuses constituting the multivision system, the image processor may be configured to determine the array of the multivision system using a plurality of the partial images.

The image processor may be configured to recognize a pattern formed by bezels of the plurality of display apparatuses in the captured image, and to determine the array of the plurality of display apparatuses using the recognized pattern.

The image processor may be configured to determine the array of the plurality of display apparatuses according to a type of the pattern and the number of each type of the pattern.

The image processor may be configured to determine a ratio between horizontal and vertical sides of the plurality of display apparatuses based on a distance between the recognized IDs.

The image processor may be configured to determine a ratio between horizontal and vertical sides of the multivision system in the captured image.

Another aspect of the disclosure provides a display apparatus included in a multivision system including: a display configured to display an ID; a communication interface configured to receive a multivision system image captured from the outside; and a controller configured to recognize each of the IDs displayed on a plurality of the display apparatuses constituting the multivision system in the multivision system image and determine an array of the plurality of display apparatuses, to determine positions of the plurality of display apparatuses based on the recognized respective IDs and the determined array of the plurality of display apparatuses, and to generate video wall setting information for each of the plurality of display apparatuses based on the determined positions of the plurality of display apparatuses.

The display may be configured to display a color of the ID differently from a color of a background screen.

The display may be configured to display a color of the ID in a color different from a bezel of the display apparatus, and to display a color of a background screen in the color different from the bezel of the display apparatus.

The controller may be configured to determine an array of the multivision system based on the determined array of the plurality of display apparatuses.

When the multivision system image is an entire image including all of the plurality of display apparatuses constituting the multivision system, the controller may be configured to determine the array of the plurality of display apparatuses as the array of the multivision system.

When the multivision system image is a partial image including a part of the plurality of display apparatuses constituting the multivision system, the controller may be configured to determine the array of the multivision system using a plurality of the partial images.

The controller may be configured to recognize a pattern formed by bezels of the plurality of display apparatuses in the multivision system image, and to determine the array of the plurality of display apparatuses using the recognized pattern.

The controller may be configured to determine the array of the plurality of display apparatuses according to a type of the pattern and the number of each type of the pattern.

The communication interface may be configured to transmit the video wall setting information for each of the plurality of display apparatuses to the other display apparatuses included in the multivision system.

Another aspect of the disclosure provides a multivision setting method including: recognizing, by an image processor, each of IDs displayed on a plurality of display apparatuses in an image in which the plurality of display apparatuses displaying the respective IDs are captured and determine an array of the plurality of display apparatuses; determining, by the image processor, positions of the plurality of display apparatuses based on the recognized respective IDs and the determined array of the plurality of display apparatuses; and generating, by a setter, video wall setting information for each of the plurality of display apparatuses based on the determined positions of the plurality of display apparatuses.

The determining of the positions of the plurality of display apparatuses may include determining the array of the plurality of display apparatuses included in the captured image; and determining an array of a multivision system including the plurality of display apparatuses based on the array of the plurality of display apparatuses.

The determining of the positions of the plurality of display apparatuses may include recognizing a pattern formed by a bezel of the plurality of display apparatuses from the captured image; and determining the array of the plurality of display apparatuses using the recognized pattern.

The determining of the positions of the plurality of display apparatuses may include determining the array of the plurality of display apparatuses according to the type of the pattern and the number of each type of the pattern.

Advantageous Effects

According to an electronic apparatus, a display apparatus, and a multivision setting method according to the embodiments, it is possible to reduce a user's work load and work time by analyzing a multivision system image and generating video wall setting information required to operate each of the display apparatuses in a video wall mode, and automatically inputting the video wall setting information to each of the display apparatuses.

DESCRIPTION OF DRAWINGS

FIGS. 7 and 8 are tables illustrating rules related to patterns used to determine an overall array of a multivision system by an electronic apparatus according to an embodiment.

FIG. 10 is a table illustrating rules for determining an array of captured parts when a part of a multivision system is captured.

MODES OF THE INVENTION

Figure 1:
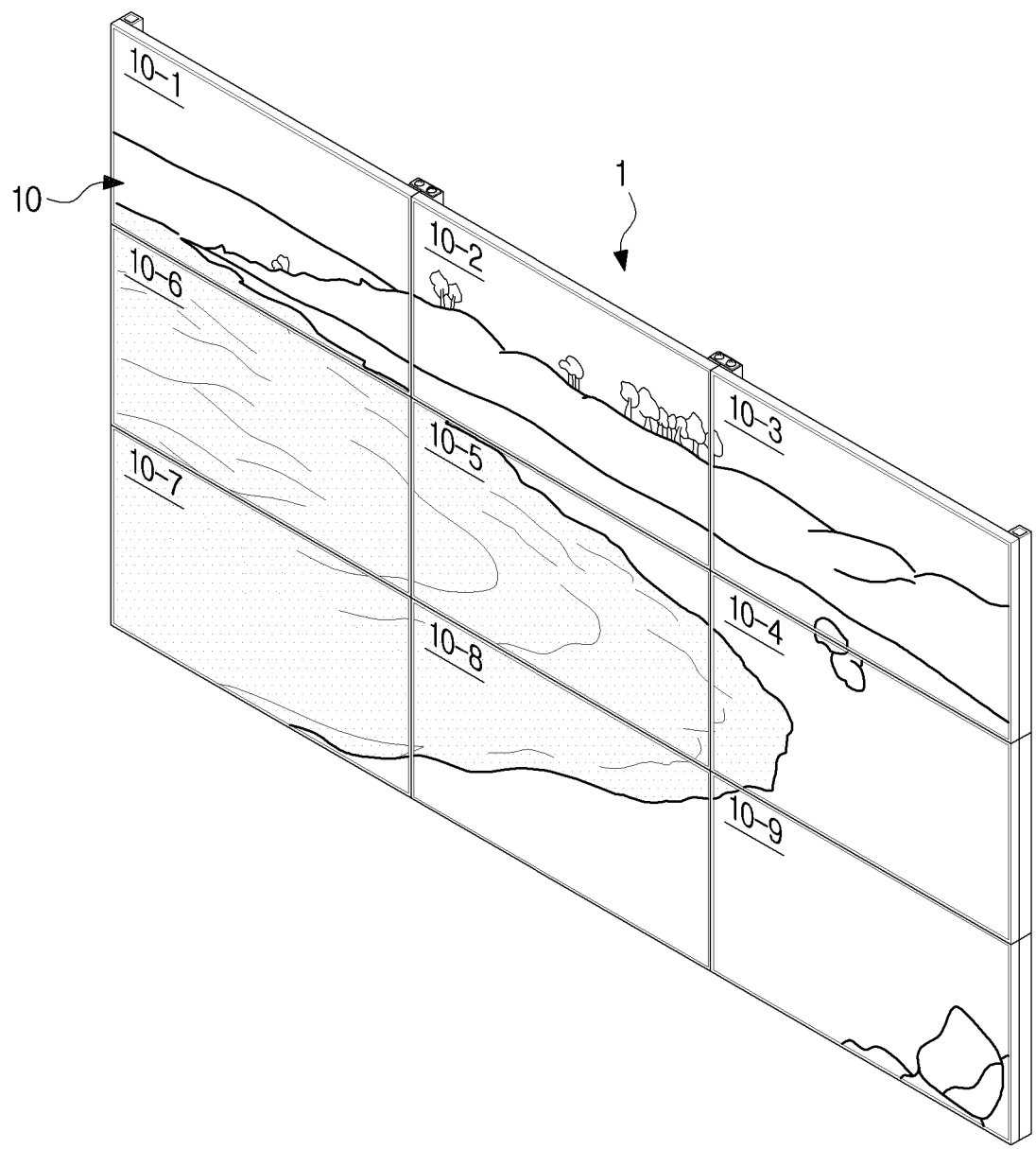
FIG. 1 is an external view illustrating an example of a multivision system.

Reference will now be made in detail to exemplary embodiments, with reference to the accompanying drawings. In the drawings, parts irrelevant to the description are omitted to clearly describe the exemplary embodiments, and like numerals refer to like elements throughout the specification. Not all elements of the embodiments of the present disclosure will be described, and the description of what are commonly known in the art or what overlaps each other in the embodiments will be omitted. The terms as used throughout the specification, such as "part," "module," "member," "block," "unit," etc., may be implemented in software (e.g., programs, applications, firmware, etc.) and/or hardware (e.g., circuits, microchips, processors, etc.), and a plurality of "parts," "modules," "members," "blocks," or "units" may be implemented in a single element, or a single "part," "module," "member," "block," or "unit" may include a plurality of elements.

It will be further understood that the term "connect" or its derivatives refer to either a direct or indirect connection, and the indirect connection includes a connection over a wireless communication network.

The terms "include (or including)" or "comprise (or comprising)" are inclusive or open-ended and do not exclude additional, unrecited elements or method steps, unless otherwise mentioned.

It is to be understood that the singular forms "a," "an," and "the" include plural references and vice versa, unless the context clearly dictates otherwise.

Hereinafter, embodiments of an electronic apparatus, and an electronic apparatus and a method of managing the electronic apparatus will be described in detail with reference to the accompanying drawings.

FIG. 1 is an external view illustrating an example of a multivision system.

A multivision system 1 may be composed of a plurality of display apparatuses arranged in a matrix form of n×m (n, m is an integer of 1 or more, and n+m is an integer of 2 or more). Each of the display apparatuses constituting the multivision system 1 may also be expressed as a set.

In FIG. 1, a case where the multivision system 1 arranged in a matrix form of 3×3 is composed of nine display apparatuses 10-1, 10-2, 10-3, 10-4, 10-5, 10-6, 10-7, 10-8, and 10-9 will be described as an example.

In order for a screen output from the plurality of display apparatuses 10-1 to 10-9 to form one image, the multivision system 1 must operate in a video wall mode. In addition, an image provided from an external source device may be divided into nine images in an array of 3×3, and the divided images should be distributed to the plurality of display apparatuses 10-1 to 10-9, respectively. The distribution of the divided images may be performed based on a position of each of display apparatuses 10 in the multivision system 1.

To operate the multivision system 1 in the video wall mode, a mode of the display apparatus 10 constituting the multivision system 1 is set to the video wall mode, and a video wall setting operation such as setting for a screen size (Full/Natural), setting for an array of an entire video wall, setting for a position of the corresponding display apparatus 10, setting for a horizontal and vertical ratio (Landscape/Portrait) of the video wall, etc., must be performed.

In addition, since the setting operation must be performed individually for each of the plurality of display apparatuses 10-1 to 10-9, in the case of the example of FIG. 1, the video wall setting operation must be performed nine times. Therefore, performing the video wall setting manually increases an administrator's work load and reduces the efficiency of the operation. In addition, errors may occur in entering setting values due to repeated manual work.

The electronic apparatus according to the embodiment may reduce the work load and work time of the administrator by recognizing the positions of the display apparatuses constituting the multivision system 1 and automatically performing the video wall setting operation based on the recognized position. Hereinafter, the configuration and operation of the electronic apparatus according to the embodiment will be described in detail.

Figure 2:
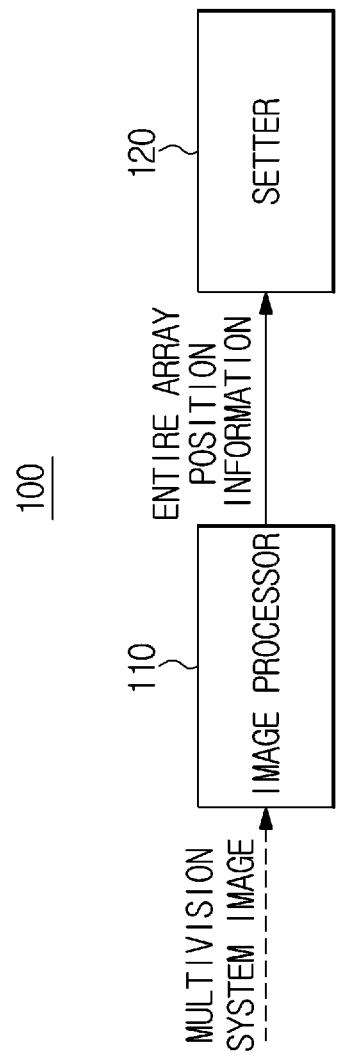
FIG. 2 is a control block diagram of an electronic apparatus according to an embodiment.
Figure 3:
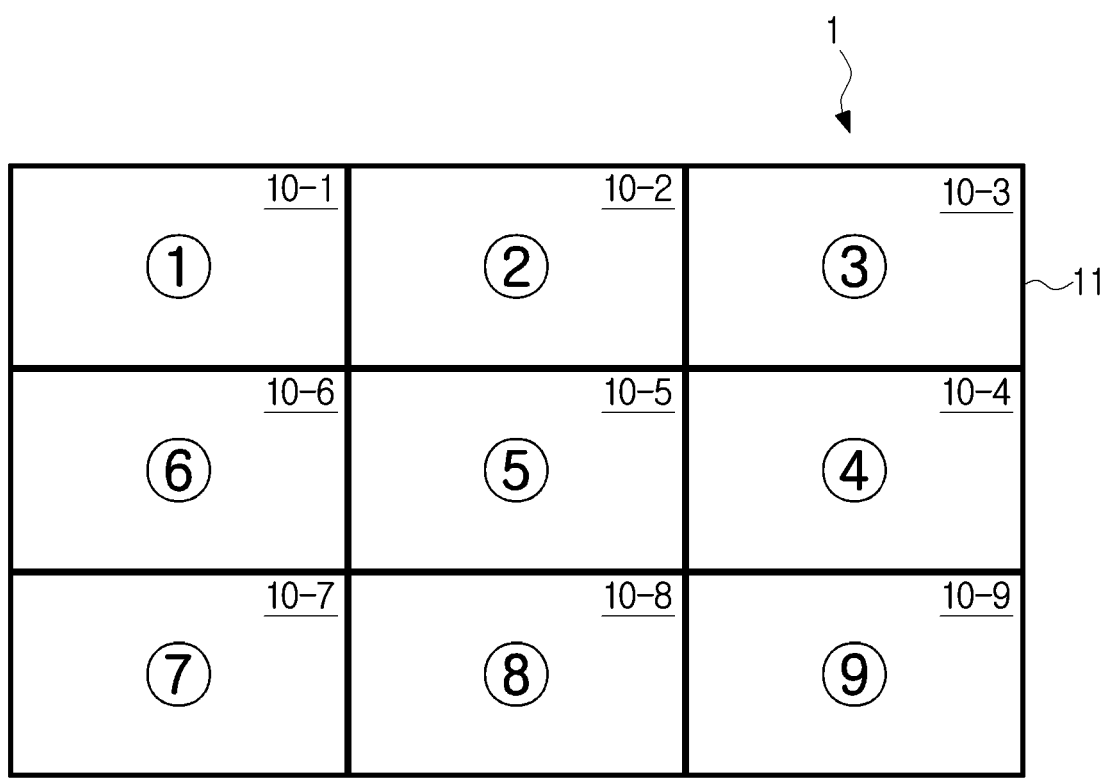
FIG. 3 is a view illustrating an example in which each of display apparatuses constituting a multivision system displays an ID.

FIG. 2 is a control block diagram of an electronic apparatus according to an embodiment, and FIG. 3 is a view illustrating an example in which each of display apparatuses constituting a multivision system displays an ID.

Referring to FIG. 2, an electronic apparatus 100 may include an image processor 110 that analyzes a multivision system image to determine the positions of the plurality of display apparatuses 10 constituting the multivision system 1, and a setter 120 that generates video wall setting values for each of the plurality of display apparatuses 10 based on the determined positions.

The electronic apparatus 100 may include at least one memory for storing a program and data necessary for executing the program that performs the operations of the image processor 110 and the setter 120, which will be described later, and at least one processor for executing the stored program.

The multivision system image used to determine the position of the display apparatus 10 may refer to an image of the multivision system 1 captured by a camera from the outside. In addition, as described later, the multivision system image may be an entire image in which the entire multivision system 1 is captured, or a partial image in which only a part of the multivision system 1 is captured.

For convenience of description, the embodiment example described below will be described by taking a case where the plurality of display apparatuses 10 constituting the multivision system 1 have the array of 3×3 as illustrated in FIG. 3.

To set the video wall for the multivision system 1, all of the plurality of display apparatuses 10-1 to 10-9 constituting the multivision system 1 are turned on and a menu for the video wall setting may be executed.

IDs for distinguishing each of the display apparatuses from the other display apparatuses are assigned to the plurality of display apparatuses 10-1 to 10-9.

For example, an assignment of the IDs may be performed according to a daisy-chain method as illustrated in FIG. 3. The IDs may be individually assigned to each of the display apparatuses using an IR receiver, or may be sequentially assigned according to a horizontal writing type after connecting the plurality of display apparatuses 10-1 to 10-9 in a daisy-chain.

The IDs may be assigned as numbers or letters, but the embodiment of the electronic apparatus 100 is not limited thereto. If different display apparatuses can be distinguished and their array order can be indicated, the IDs may be assigned even if the IDs are not the numbers or the letters.

When the menu for the video wall setting is executed, the plurality of display apparatuses 10-1 to 10-9 respectively display their own IDs. At this time, the displayed ID may be displayed at the center of the display apparatus 10, and may have a color distinct from a color of a bezel 11 of the display apparatus 10. In addition, it is possible to improve a recognition rate of the ID by displaying a background screen excluding the ID in the color distinct from the ID.

In addition, as will be described later, the image processor 110 may recognize a pattern formed by the bezel 11 of the display apparatus 10 to determine the array of the multivision system 1, and the display apparatus 10 may improve a recognition rate of the bezel 11 by displaying the background screen in a color different from that of the bezel 11.

As illustrated in FIG. 3, when the multivision system image in which the plurality of display apparatuses 10-1 to 10-9 with the IDs are captured is transmitted to the image processor 110, the image processor 110 may analyze the captured image to determine the array of the plurality of display apparatuses 10-1 to 10-9, recognize the ID displayed on the plurality of display apparatuses 10-1 to 10-9, and determine the position of each of the plurality of display apparatuses 10-1 to 10-9 within the multivision system 1.

When the captured multivision system image is the entire image including all of the plurality of display apparatuses 10-1 to 10-9 constituting the multivision system 1, the image processor 110 may determine the array of the plurality of the display apparatuses 10-1 to 10-9 determined from the entire image as the array of the multivision system 1, that is, an entire set array.

In addition, when the captured multivision system image is a partial image including only a part of the plurality of display apparatuses 10-1 to 10-9 constituting the multivision system 1, the image processor 110 may determine the array of the multivision system 1 by combining a plurality of the partial images.

On the other hand, there is no limit to the order between the determination of the entire set array and the ID recognition. It is also possible that the ID is recognized after the entire set array is determined, and it is also possible that the entire set array is determined after the ID is recognized. In addition, it is also possible to perform the determination of the entire set array and the ID recognition at the same time according to the implementation example of the image processor 110.

For example, when the image processor 110 analyzes the multivision system image and determines that the array of the multivision system 1 is 3×3, the display apparatus 10-3 having an ID 3 of the plurality of display apparatuses 10-1 to 10-9 may determine that the position in the multivision system 1 is (1, 3). In the embodiment, each of the positions of the display apparatuses 10 constituting the multivision system 1 will be represented by two-dimensional position coordinates.

The setter 120 may generate the video wall setting value for each of the plurality of display apparatuses 10-1 to 10-9 based on the array of the multivision system 1 and position information of the plurality of display apparatuses 10-1 to 10-9.

The image processor 110 and the setter 120 may include at least one memory in which programs for performing the above-described operations and the operations described below are stored, and at least one processor for executing the stored programs. It is also possible for the image processor 110 and the setter 120 to share the memory or the processor, and it is also possible to use a separate memory or processor.

The electronic apparatus 100 may be provided in the multivision system 1, or may be provided in a separate mobile device, set-top box, or playback device. When the electronic apparatus 100 is provided in the multivision system 1, it may be provided in one of the plurality of display apparatuses 10-1 to 10-9 constituting the multivision system 1, or may be implemented in a separate controller form provided outside of the display apparatus 10.

Hereinafter, in order to describe a specific embodiment, a case in which the electronic apparatus 100 is provided in the mobile device and a case in which the electronic apparatus 100 is provide in one of the plurality of display apparatuses 10-1 to 10-9 will be described as an example.

Figure 4:
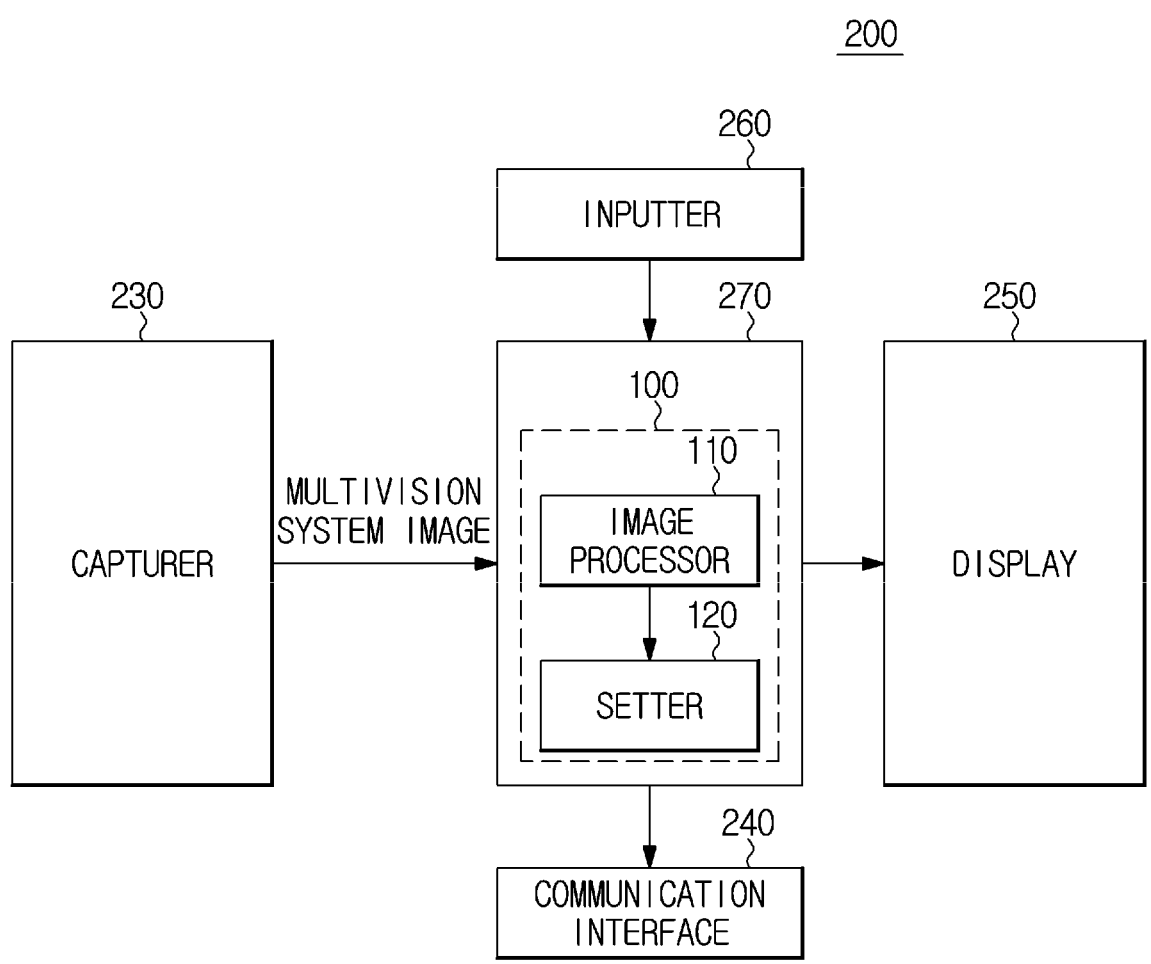
FIG. 4 is a control block diagram of a mobile device including an electronic apparatus according to an embodiment.
Figure 5:
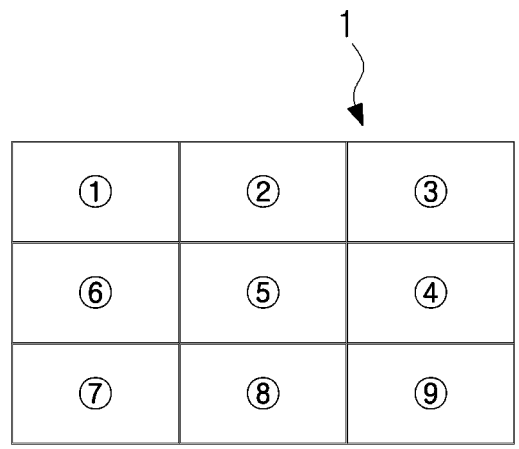
FIG. 5 is a view illustrating a mobile device for capturing an image of a multivision system.
Figure 5:
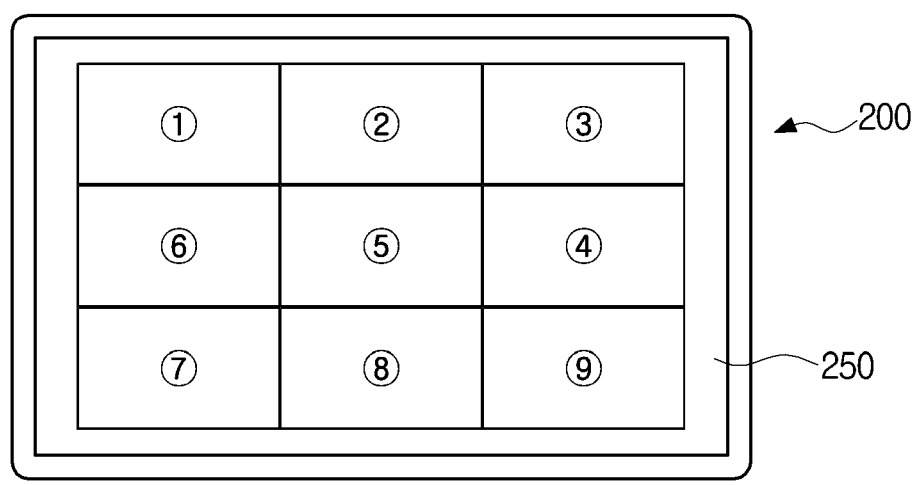

FIG. 4 is a control block diagram of a mobile device including an electronic apparatus according to an embodiment, and FIG. 5 is a view illustrating a mobile device for capturing an image of a multivision system.

Referring to FIG. 4, a mobile device 200 may include a capturer 230 that captures the multivision system 1, the electronic apparatus 100 that analyzes the captured image, determines the positions of the plurality of display apparatuses 10 constituting the multivision system 1, and generates the video wall setting values for each of the display apparatuses 10 based on the determined position, a communication interface 240 that transmits the generated video wall setting value to the multivision system 1, a display 250 that displays the captured image, and an inputter 260 that receives a user command.

The mobile device 200 may be a portable electronic apparatus such as a smartphone, a personal digital assistant (PDA), a tablet PC, or a laptop computer. A built-in camera is capable of taking an image, and the processor and the memory are provided to perform the operation of the electronic apparatus 100, and other restrictions are not placed on a type of the mobile device 200.

The capturer 230 may include a camera that captures the image, such as a CCD camera or a CMOS camera. In addition, the image captured by the capturer 230 may be displayed by distinguishing colors.

The communication interface 240 may include at least one of a wireless communication module and a short-range communication module that can communicate with other electronic apparatuses to exchange data.

The wireless communication module may include at least one of various wireless communication modules that can be connected to an Internet network through wireless communication methods such as Wi-Fi, Wireless Broadband, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), 4th generation (4G) mobile communication, and 5th generation (5G) mobile communication.

The short-range communication module may include at least one of various short-range communication modules such as a Bluetooth module, an infrared communication module, a radio frequency identification (RFID) communication module, a wireless local access network (WLAN) communication module, an NFC communication module, and a Zigbee communication module.

The communication interface 240 may transmit the video wall setting value for each of the display apparatuses 10 to the multivision system 1, and the communication interface 240 may include the communication module corresponding to the communication module provided in the multivision system 1 among examples of the communication module described above.

The display 250 may include one of displays such as a liquid crystal display (LCD), a light emitting diode (LED), an organic light emitting diode (OLED), a plasma display panel (PDP), and a cathode ray tube (CRT).

The inputter 260 may include a button, a touch pad, or a combination thereof.

Meanwhile, the operation of the electronic apparatus 100 described above in the mobile device 200 may be performed by executing an application installed in the mobile device 200. The application that performs the operation of the electronic apparatus 100 may be an embedded application basically installed in the mobile device 200, or a third-party application provided from an external recording medium.

In the latter case, a program (hereinafter referred to as 'video wall setting program') for performing the above-described operation of the electronic apparatus 100 and the operation of the electronic apparatus 100 described later may be stored in the external recording medium. When the user downloads the video wall setting program from the external recording medium and installs the video wall setting program on the mobile device 200, the video wall setting program may be stored in the memory provided in the mobile device 200, and the processor provided on the mobile device 200 may execute the stored video wall setting program.

Whether a video wall setting application is basically installed or provided as the external recording medium, the memory and the processor provided in the mobile device 200 or a controller 270 including the application may implement the electronic apparatus 100.

As illustrated in FIG. 5, the user may capture the multivision system 1 with the plurality of display apparatuses 10-1 to 10-9 displaying their IDs using the capturer 230 of the mobile device 200, respectively. The captured image may be displayed on the display 250 of the mobile device 200.

When the user operates the video wall setting application by operating the inputter 260 of the mobile device 200, the controller 270 may perform the operation of the electronic apparatus 100 described above.

Particularly, the controller 270 may determine the position of each of the display apparatuses 10 in the multivision system 1 by analyzing the image captured by the capturer 230 to determine the array of the plurality of display apparatuses 10-1 to 10-9 and recognizing the displayed IDs.

Also, based on the determined position of the display apparatus 10, the video wall setting value may be generated for each of the plurality of display apparatuses 10-1 to 10-9.

The controller 270 may transmit the video wall setting values for each of the plurality of display apparatuses 10-1 to 10-9 to the multivision system 1 through the communication interface 240.

The multivision system 1 may perform the video wall setting using the video wall setting values for each of the plurality of transmitted display apparatuses 10-1 to 10-9. Accordingly, it is possible to reduce the inconvenience of the user having to manually input the video wall setting value for each of the plurality of display apparatuses 10-1 to 10-9.

Figure 6:
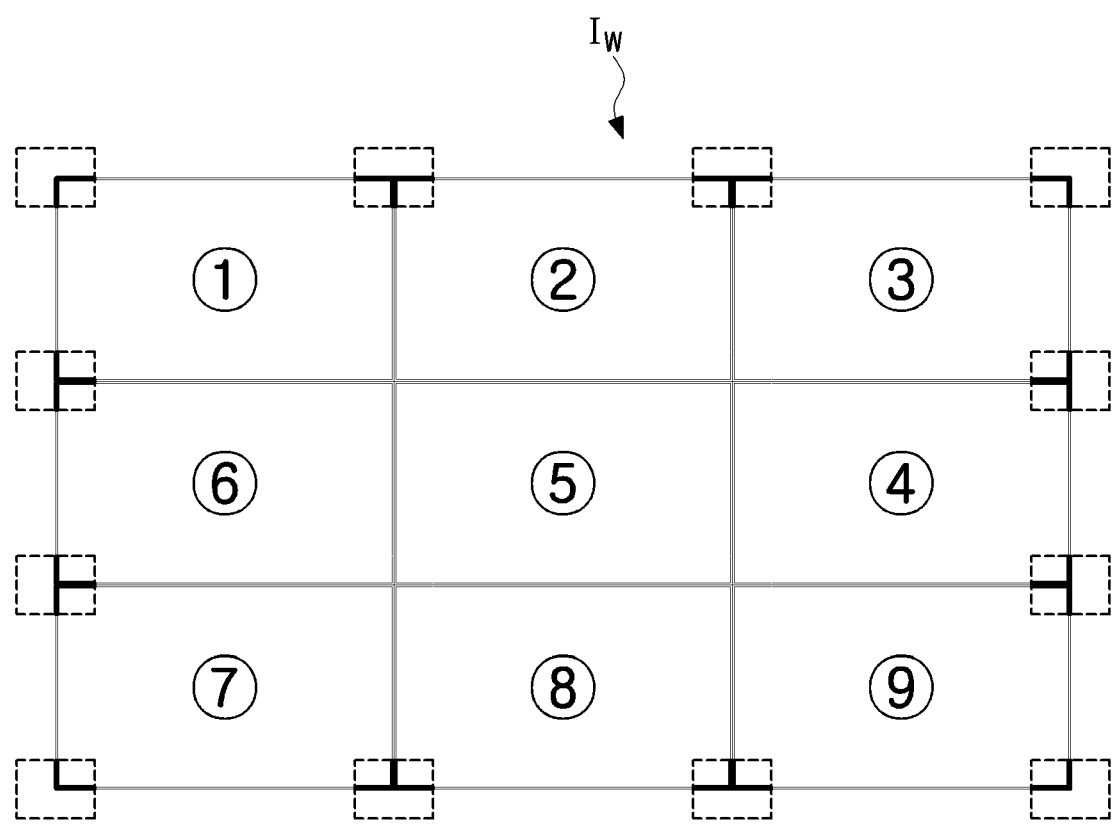
FIG. 6 is a view illustrating an example of patterns used to determine an overall array of a multivision system by an electronic apparatus according to an embodiment.

FIG. 6 is a view illustrating an example of patterns used to determine an overall array of a multivision system by an electronic apparatus according to an embodiment, and FIGS. 7 and 8 are tables illustrating rules related to patterns used to determine an overall array of a multivision system by an electronic apparatus according to an embodiment. In the embodiment described later, the case where the multivision system 1 is configured in a square shape will be described as an example.

For convenience of description, the pattern formed by the bezel 11 is emphasized in a multivision system image Iw and a square window is displayed.

Referring to FIG. 6, the image processor 110 may recognize the pattern formed by the bezel 11 of the display apparatus 10 illustrated in the multivision system image Iw. As described above, the background screen displayed on the plurality of display apparatuses 10-1 to 10-9 may have a color distinct from the bezel. The square window displayed in the multivision system image Iw of FIG. 6 is illustrated to emphasize the recognized pattern, and it goes without saying that it is not included in the actually captured image.

For example, the pattern formed by the bezel may include at least one of ⊢, ⊣, ⊥, ⊓, ⌐, , ⌐, and ⌐.

⌐, , ⌐ and ⌐ may be the patterns (hereinafter referred to as 'edge patterns') formed by the bezel of an edge portion, in particular, the bezel of the edge portion of the entire multivision system 1. As illustrated in FIG. 7, when all four edge patterns are recognized, it may be determined that the entire multivision system 1 is captured. That is, it may be determined that the multivision system image Iw is the entire image including the entire multivision system 1.

On the other hand, if any one of the four edge patterns is not recognized, it may be determined that a part of the multivision system 1 is captured. That is, it may be determined that the multivision system image Iw is the partial image including only part of the multivision system 1.

⊢, ⊣, ⊥ and ⊤ may be the patterns (hereinafter referred to as 'boundary patterns') formed by the bezel located at the edge of the entire multivision system 1 and the bezel located at a boundary between two of the display apparatuses adjacent to each other.

⊢ and ⊣ may be the patterns (hereinafter referred to as 'row boundary patterns') formed by two of the display apparatuses 10 adjacent in a vertical direction or two of the display apparatuses 10 adjacent to each other while belonging to the same column and another row. Since ⊢ among ⊣ and ⊢ is located at a left edge, it may be referred to as a left row boundary pattern, and ⊣ may be referred to as a right row boundary pattern because they are located at a right edge.

⊥ and ⊤ may be the patterns (hereinafter referred to as 'column boundary patterns') formed by two of the display apparatuses 10 adjacent in a left-right direction or two of the display apparatuses 10 adjacent to each other while belonging to the same row and another column. Since ⊥ among ⊥ and ⊤ is located at a lower edge, it may be referred to as a lower column boundary pattern, and ⊤ may be referred to as an upper column boundary pattern because it is located at an upper edge.

When the entire multivision system 1 is captured, as illustrated in FIG. 8, the number of rows in the array of the entire multivision system 1 may be determined based on the number of row boundary patterns (n1 or n2) (n1 and n2 are integers of 1 or more). When the entire multivision system 1 is captured, the number of left row boundary patterns n1 and the number of right row boundary patterns n2 may be the same (n1=n2=n), and the number of rows in the entire set array may be n+1, that is, a value obtained by adding 1 to the number of the left row boundary patterns n1 or the number of the right row boundary patterns n2.

In addition, the number of columns in the array of the entire multivision system 1 may be determined based on the number of column boundary patterns (m1 or m2) (m1 and m2 are integers of 1 or more). When the entire multivision system 1 is captured, the number of upper column boundary patterns m1 and the number of lower column boundary patterns m2 may be the same (m1=m2=m), and the number of columns in the entire set array may be m+1, that is, a value obtained by adding 1 to the number of the upper column boundary patterns m1 or the number of the lower column boundary patterns m2.

Although all of the four edge patterns were recognized, the number of the left row boundary patterns n1 and the number of the right row boundary patterns n2 were not the same (n1≠n2), or the number of the upper column boundary patterns m1 and the number of the lower column boundary patterns m2 were not the same (m1≠m2). The image processor 110 may generate an error code, as an error occurs in capturing or an error occurs in recognition. In this case, re-capturing may be guided by displaying a warning according to the occurrence of the error code on the display 250.

Alternatively, it is also possible to recognize only one of the left row boundary pattern and the right row boundary pattern in order to reduce an amount of computation and a computation time of the processor. In this case, a value obtained by adding 1 to the number of recognized patterns may be determined as the number of rows in the entire set array.

Similarly, only one of the upper column boundary pattern and the lower column boundary pattern may be recognized, and in this case, a value obtained by adding 1 to the number of recognized patterns may be determined as the number of columns in the entire set array.

Meanwhile, a reference for determining whether the entire multivision system 1 has been captured, and a reference for determining that the error has occurred in capturing or recognition may vary according to the shape of the entire multivision system 1. When the shape of the entire multivision system 1 is a square, the above-described reference may be applied, but if the shape of a polygon is not a square or the entire set array cannot be expressed as a matrix, another suitable reference may be applied.

The image processor 110 may determine the positions of the plurality of display apparatuses 10 constituting the multivision system 1 based on the entire array through the ID and pattern recognition recognized in the multivision system image Iw.

For example, when IDs 1 to 9 are recognized in the multivision system image Iw, and the entire array determined through the pattern recognition is 3×3, the image processor 110 may determine that the display apparatus 10-1 with the ID 1 is located in (1, 1) within the multivision system 1, i.e., in a first row and a first column, may determine the display apparatus 10-2 with the ID 2 is located in (2, 1) within the multivision system 1, and may determine the display apparatus 10-3 with the ID 3 is located in (3, 1) within the multivision system 1.

In addition, when the IDs are assigned in the daisy-chain method, the display apparatus 10-4 with the ID 4 is located in (2, 3) within the multivision system 1, and the display apparatus 10-7 with the ID 7 is located in (3, 1) within the multivision system 1. In the same method, the position of the remaining display apparatus 10 may also be determined.

Figure 9:
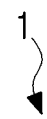
FIG. 9 is a view illustrating an appearance of a multivision system having an array of 6×6.

FIG. 9 is a view illustrating an appearance of a multivision system having an array of 6×6, FIG. 10 is a table illustrating rules for determining an array of captured parts when a part of a multivision system is captured, and FIGS. 11 to 16 are views illustrating an example of patterns in which a part of a multivision system is recognized in a captured image.

When the number of the display apparatus 10 constituting the multivision system 1 is large or the size of the display apparatus 10 is large, the user may capture an image by partially dividing the multivision system 1. Alternatively, regardless of the size of the multivision system 1, even if the multivision system 1 is to be divided and used, the user may divide the multivision system 1 into areas to capture.

As illustrated in FIG. 9, the case in which the multivision system 1 has the array of 6×6, that is, a total of 36 display apparatuses 10-1 to 10-36 will be described as an example.

As described above, the image processor 110 may determine that the multivision system image is the partial image if one of the four edge patterns is not recognized.

Figure 11:
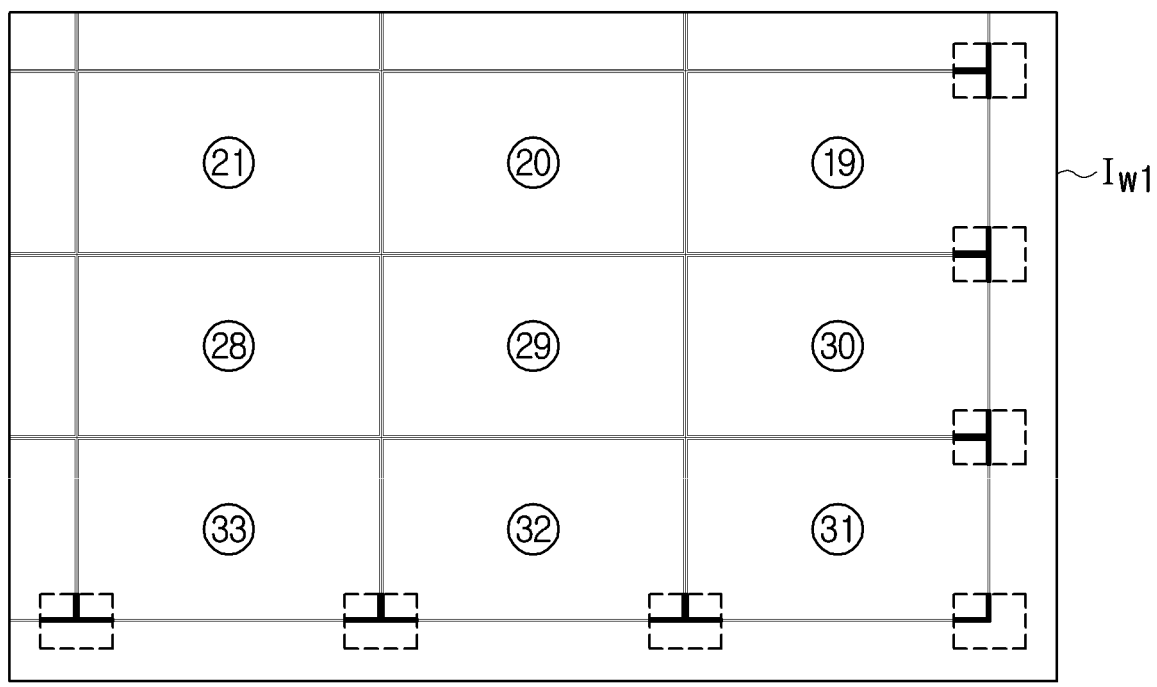
FIGS. 11 to 16 are views illustrating an example of patterns in which a part of a multivision system is recognized in a captured image.

Referring to FIGS. 10 and 11, when only ⌟ among the edge patterns is recognized, it may be the case where a portion corresponding to a lower right edge area of the multivision system 1 is captured. That is, it may be the case that only the lower right edge area of the multivision system 1 is included in a partial image Iw1.

Accordingly, when only ⌟ among the edge patterns is recognized, the image processor 110 may recognize the right row boundary pattern ⊣ and the lower column boundary pattern ⊥. When the number of the right row boundary patterns is n2 and the number of the lower column boundary patterns is m2, the plurality of display apparatuses 10 included in the captured partial image Iw1 may be determined to have an array of n2×m2. In the example of FIG. 11, it may be determined that the array has 3×3.

Meanwhile, when determining the array of the display apparatus 10 from the partial image, it is assumed that only the display apparatus 10 entirely included in the partial image is included in the array.

Figure 12:
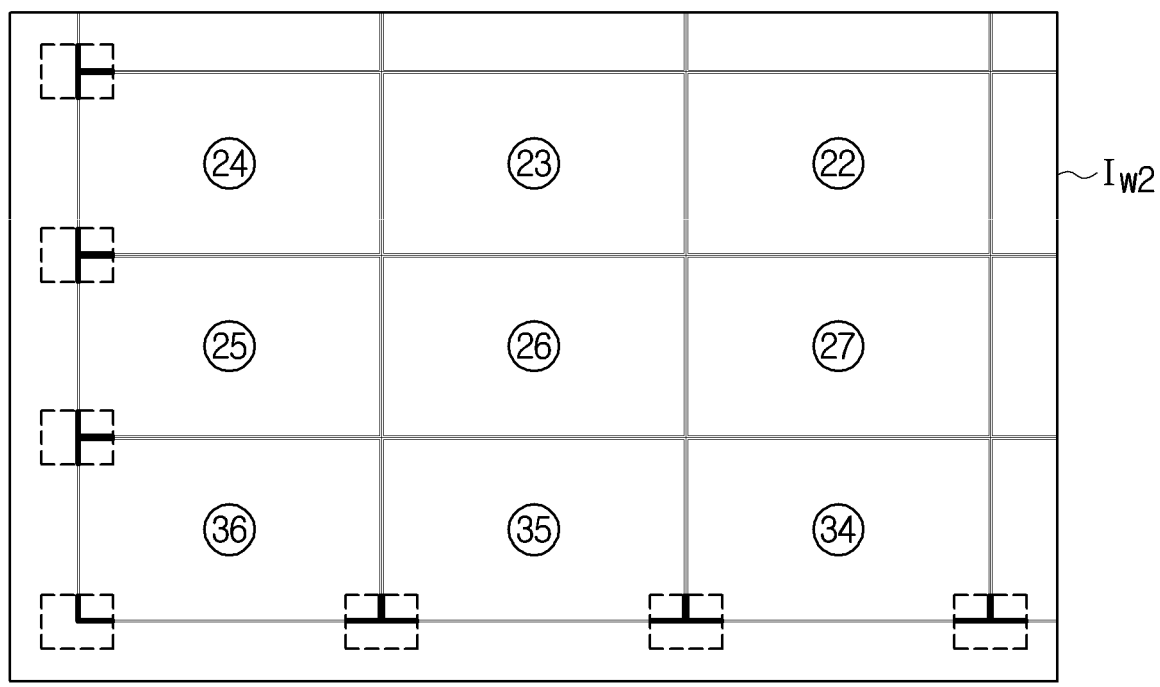

In addition, referring to FIGS. 10 and 12, when only ⌞ among the edge patterns is recognized, it may be the case where the portion corresponding to the lower left edge area of the multivision system 1 is captured. That is, it may be the case that only the lower left edge area of the multivision system 1 is included in a partial image Iw2.

Accordingly, when only ⌞ among the edge patterns is recognized, the image processor 110 may recognize the left row boundary pattern ⊢ and the lower column boundary pattern ⊥. When the number of the left row boundary patterns is n1 and the number of the lower column boundary patterns is m2, the plurality of display apparatuses 10 included in the captured partial image Iw2 may be determined to have an array of n1×m2. In the example of FIG. 12, it may be determined that the array has 3×3.

Figure 13:
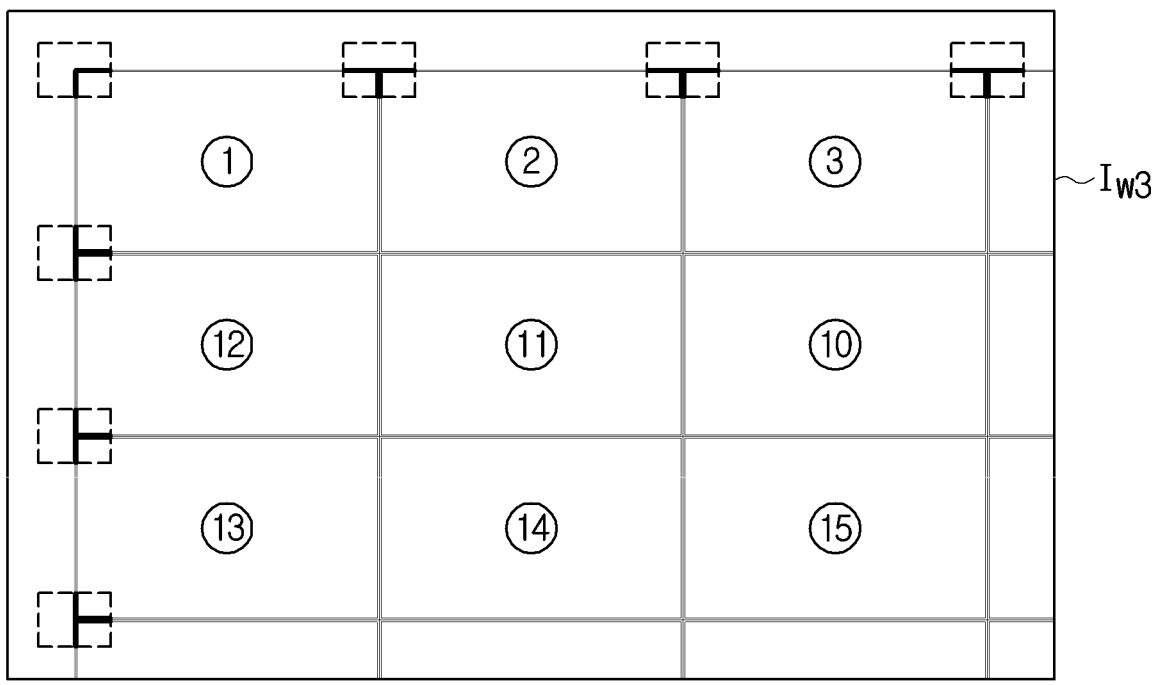

In addition, referring to FIGS. 10 and 13, when only ⌜ among the edge patterns is recognized, it may be the case where the portion corresponding to the upper left edge area of the multivision system 1 is captured. That is, it may be the case that only the upper left edge area of the multivision system 1 is included in a partial image Iw3.

Accordingly, when only ⌜ among the edge patterns is recognized, the image processor 110 may recognize the left row boundary pattern ⊢ and the upper column boundary pattern ⊤. When the number of the left row boundary patterns is n1 and the number of the upper column boundary patterns is m1, the plurality of display apparatuses 10 included in the captured partial image Iw3 may be determined to have an array of n1×m1. In the example of FIG. 13, it may be determined that the array has 3×3.

Figure 14:
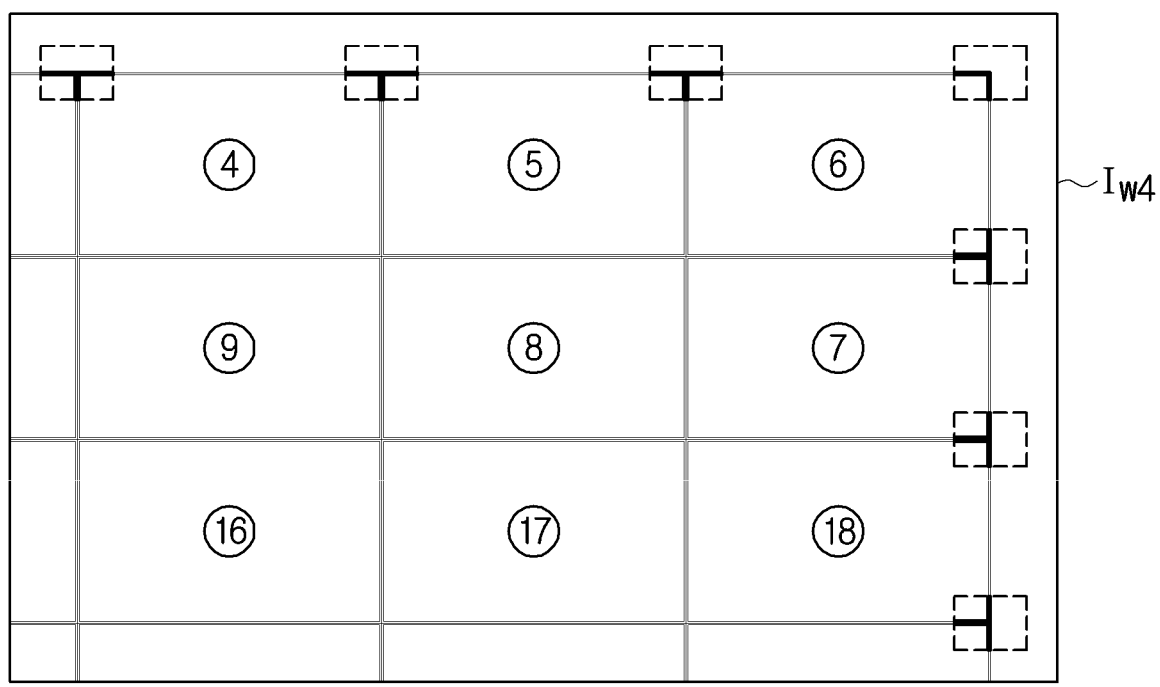

In addition, referring to FIGS. 10 and 14, when only ⌝ among the edge patterns is recognized, it may be the case where the portion corresponding to the upper right corner region of the multivision system 1 is captured. That is, it may be the case that only the upper right edge area of the multivision system 1 is included in a partial image Iw4.

Accordingly, when only ⌝ among the edge patterns is recognized, the image processor 110 may recognize the right row boundary pattern ⊣ and the upper column boundary pattern ⊤. When the number of the right row boundary patterns is n2 and the number of the upper column boundary patterns is m1, the plurality of display apparatuses 10 included in the captured partial image Iw4 may be determined to have an array of n2×m1. In the example of FIG. 14, it may be determined to have the array of 3×3.

When the entire multivision system 1 having the array of 6×6 is divided and captured into four parts having the array of 3×3 as illustrated in FIGS. 11 to 14 described above, the image processor 110 may display the four partial images Iw1, Iw2, Iw3, and Iw4 to determine the array of 3×3 of the display apparatus 10 included in each of the partial images, and may combine them to determine the array of 6×6 of the entire multivision system 1.

For example, the four edge patterns are included in each of the four partial images. When the entire array 6×6 determined by combining the four partial images matches the largest value among the IDs recognized in the four partial images, it may be determined that the entire multivision system 1 is included in the four partial images.

In the example of FIGS. 11 to 14, since the largest value among the IDs recognized in the partial image for the upper left edge area, the partial image for the upper right edge area, the partial image for the lower left edge area, and the partial image for the lower right edge area is 36, and the entire array determined by pattern analysis of the partial image is 6×6, the image processor 110 may determine the array of the entire multivision system 1 as 6×6.

Figure 15:
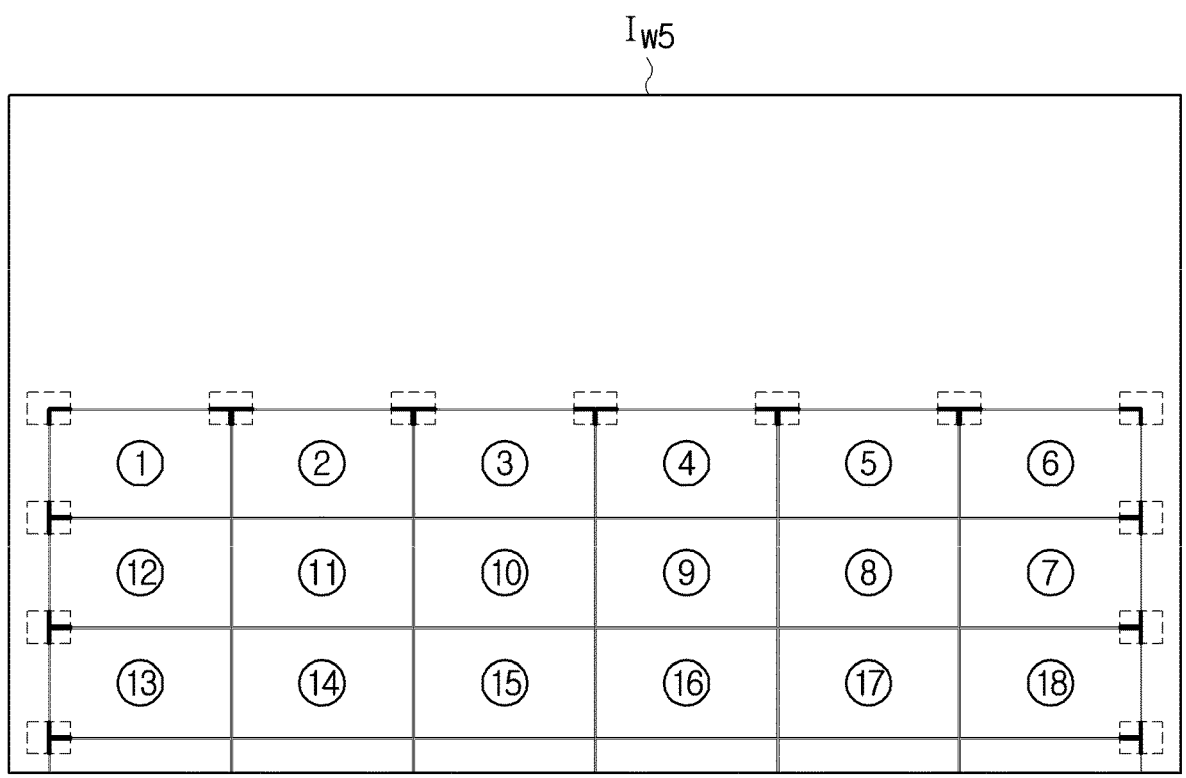
Figure 16:
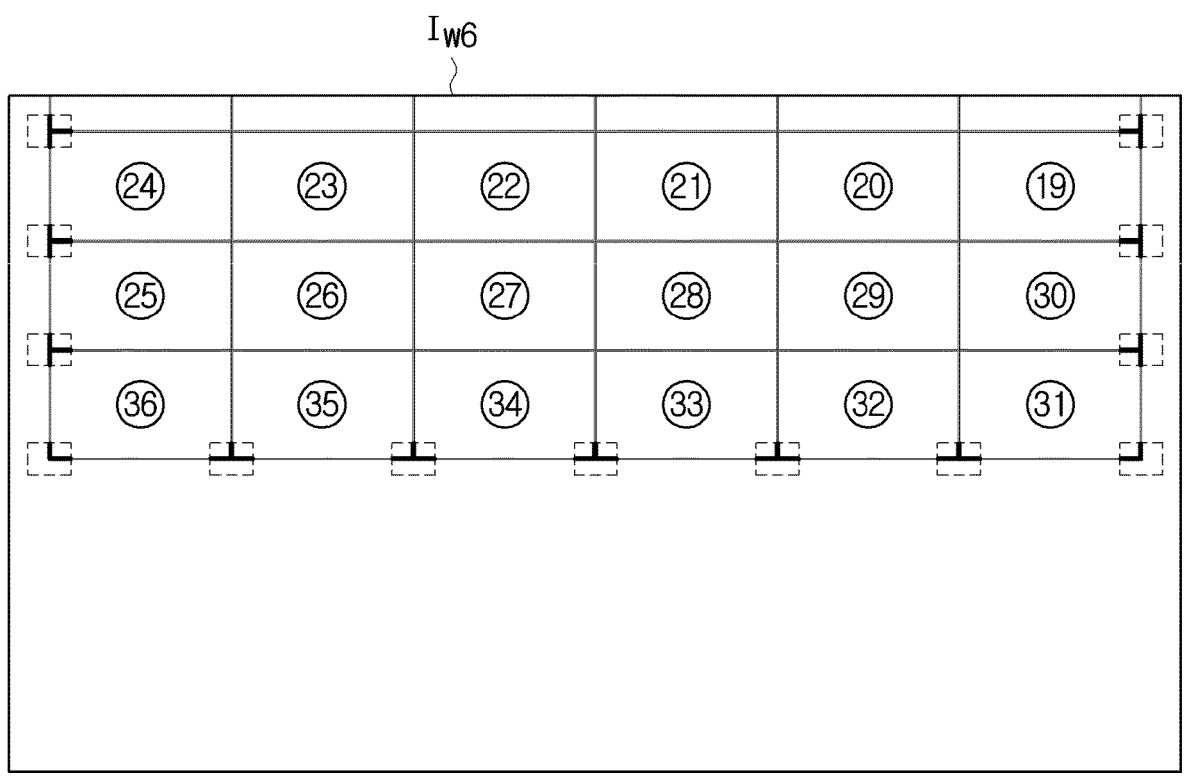

In addition, as illustrated in FIGS. 15 and 16, it is also possible to divide the multivision system 1 into two areas, upper and lower, to capture.

Referring to FIG. 10 again, when ⌝ and ⌜ among the edge patterns are recognized, it may be a case where a portion corresponding to an upper area of the multivision system 1 is captured as illustrated in FIG. 15. That is, it may be the case that only the upper area of the multivision system 1 is included in a partial image Iw5.

Therefore, when ⌝ and ⌜ among the edge patterns are recognized, the image processor 110 may recognize the upper column boundary pattern ⊤ and the right row boundary pattern ⊣ or the left row boundary pattern ⊢. The image processor 110 may recognize only one of the right row boundary pattern ⊣ and the left row boundary pattern ⊢. The image processor 110 may determine the array of the plurality of display apparatuses 10 included in the partial image Iw5 as n1×(m1+1) or n2×(m1+1) using the number of the recognized patterns (n1 or n2) and the left row boundary pattern ⊢ and the number of the upper column boundary patterns m1.

Alternatively, as illustrated in FIG. 10, when both the right row boundary pattern ⊣ and the left row boundary pattern ⊢ are recognized and the number of the right row boundary patterns n2 and the number of the left row boundary patterns n1 match (n1=n2=n), the image processor 110 may determine the array of the plurality of display apparatuses 10 as n×(m1+1). When the number of the right row boundary patterns n2 and the number of the left row boundary patterns n1 do not match, the image processor 110 may generate the error code.

In addition, when ∟ and ⌟ of the edge patterns are recognized, it may be the case where the portion corresponding to the lower area of the multivision system 1 is captured as illustrated in FIG. 16. That is, it may be the case that only the lower area of the multivision system 1 is included in a partial image Iw6.

Accordingly, when ∟ and ⌟ among the edge patterns are recognized, the image processor 110 may recognize the upper column boundary pattern ⊤ and the right row boundary pattern ⊣ or the left row boundary pattern ⊢. The image processor 110 may recognize only one of the right row boundary pattern ⊣ and the left row boundary pattern ⊢. The image processor 110 may determine the array of the plurality of display apparatuses 10 included in the partial image Iw6 as n1×(m2+1) or n2×(m2+1) using the number of the recognized patterns (n1 or n2) and the left row boundary pattern ⊢ and the number of the lower column boundary patterns m2. In the example of FIG. 16, it may be determined to have an array of 3×6.

Alternatively, as illustrated in FIG. 10, when both the right row boundary pattern ⊣ and the left row boundary pattern ⊢ are recognized and the number of the right row boundary patterns n2 and the number of the left row boundary patterns n1 match (n1=n2=n), the image processor 110 may determine the array of the plurality of display apparatuses 10 as n×(m1+1). When the number of the right row boundary patterns n2 and the number of the left row boundary patterns n1 do not match, the image processor 110 may generate the error code.

Regarding the example of FIGS. 15 and 16, the image processor 110 may determine the entire array of the partial image Iw5 for the upper area and the partial image Iw6 for the lower area of the multivision system 1 as 6×6. In addition, since the two partial images Iw5 and Iw6 include all of the four edge patterns, the largest value among the IDs recognized in the partial image is 36, and the entire array determined by the pattern analysis of the partial image is 6×6, so the image processor 110 may determine the array of the entire multivision system 1 as 6×6.

Meanwhile, the case in which all of the four edge patterns are recognized may occur even in the partial image according to a capturing method. When all of the four edge patterns are recognized in one image, the image processor 110 may determine whether the array determined by the pattern recognition matches the largest value among the IDs recognized in the one image. When the largest value among the IDs recognized in the one image and the array determined by the pattern recognition does not match, the image processor 110 may generate the error code and output a warning to the user. The above-described operation may be applied not only when the partial image is captured, but also when the entire image is captured but the error occurs in capturing or recognition.

Meanwhile, the electronic apparatus 100 may set the display apparatuses 10 included in the partial image to constitute a partial video wall according to the user's intention. As illustrated in the above-described examples of FIGS. 11 to 14, when the user captures the image by dividing it into the four partial images, and when a partial video wall mode is selected, the entire multivision system 1 may be divided into four areas, and the plurality of display apparatuses 10 included in each of the areas may constitute one partial video wall. Four source screens may be displayed on the four partial video walls, and the four source screens may be the same or different.

The mobile device 200 including the electronic apparatus 100 may receive a selection as to whether to set the partial video wall or not to confirm the user's intention. When the image processor 110 determines that the partial image is input, the display 250 of the mobile device 200 may display a screen asking whether or not to make a partial video wall setting, and the user may input the selection as to whether to set the partial video wall through the inputter 260.

Figure 17:
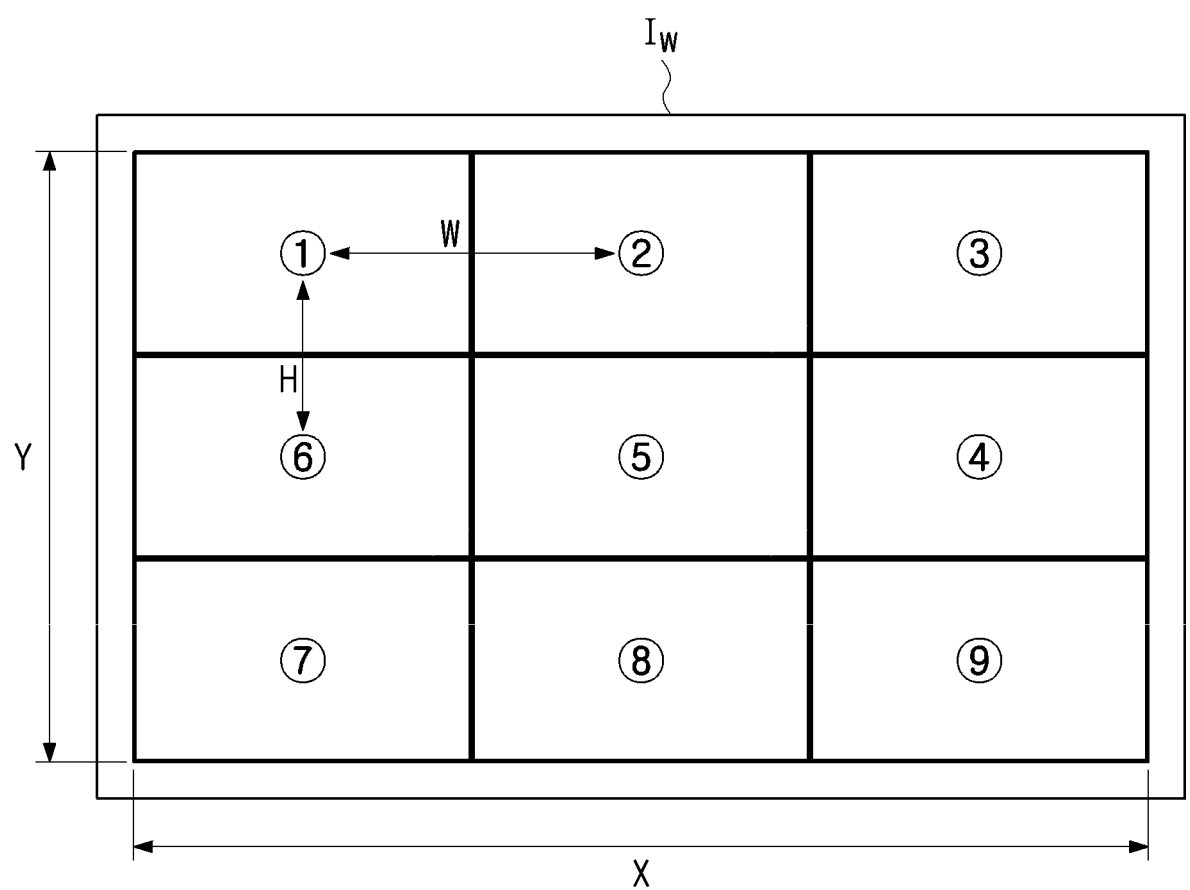
FIGS. 17 and 18 are views illustrating an operation performed by an image processor to determine a horizontal/vertical ratio of a multivision system.
Figure 18:
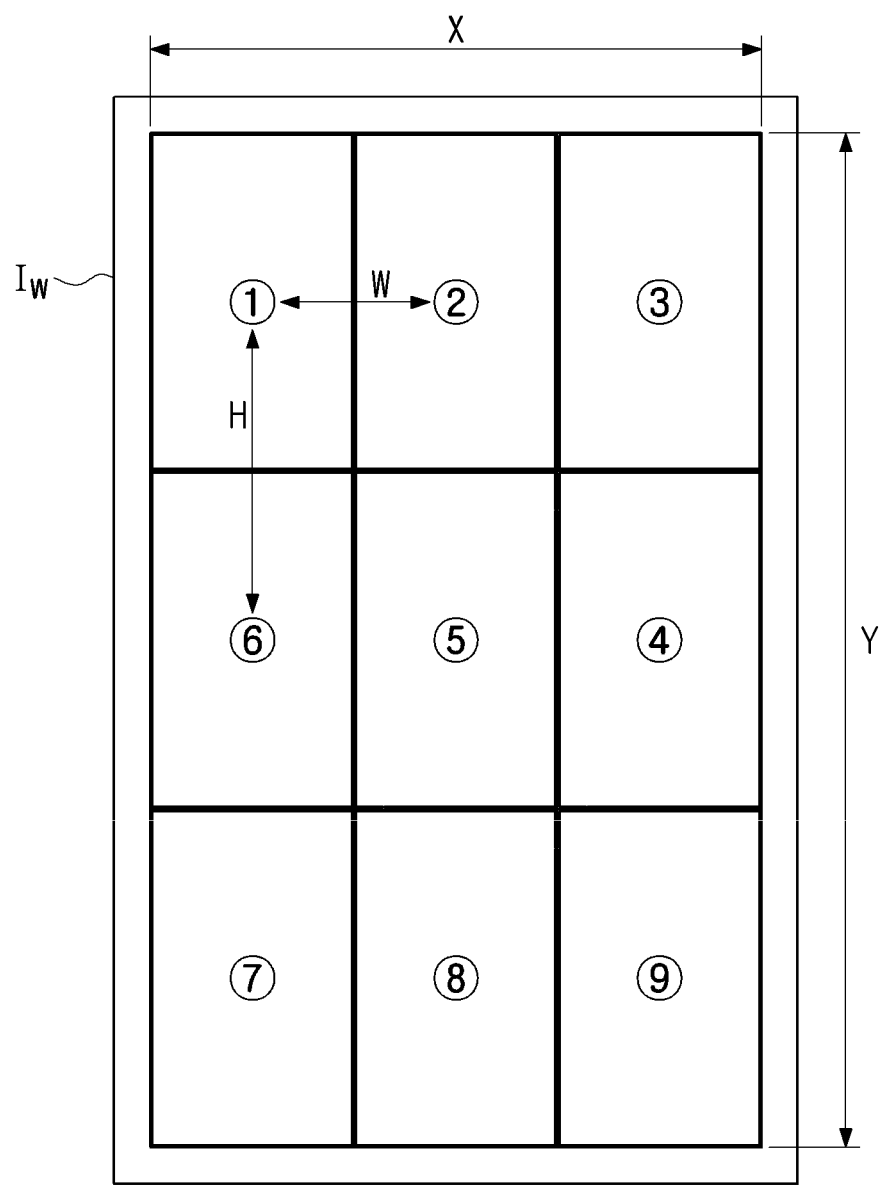

FIGS. 17 and 18 are views illustrating an operation performed by an image processor to determine a horizontal/vertical ratio of a multivision system.

As illustrated in FIG. 17, the image processor 110 may calculate a distance W and H between adjacent the IDs in the multivision system image Iw, and may determine an arrangement direction or a horizontal/vertical ratio of the display apparatus 10 constituting the multivision system 1 using the calculated distance.

Particularly, the image processor 110 may calculate the distance H (hereinafter referred to as 'vertical distance') between the IDs displayed on two of the display apparatuses 10 adjacent to each other vertically or the IDs displayed on two of the display apparatuses 10 adjacent to each other while belonging to the same column and the distance W (hereinafter referred to as 'left-right distance') between the IDs displayed on two of the display apparatuses 10 adjacent to the left or right or the IDs displayed on two of the display apparatuses 10 adjacent to each other while belonging to the same row.

The image processor 110 may calculate the ratio of the left-right distance W and the vertical distance H, and may determine the horizontal/vertical ratio or the arrangement direction of the display apparatus 10 based on the calculated ratio. For example, when the ratio of the left-right distance W and the vertical distance H is 16:9, as illustrated in FIG. 17, the image processor 110 may determine that the display apparatus 10 is horizontally arranged in the multivision system 1. This arrangement may be called a landscape mode.

Alternatively, as illustrated in FIG. 18, when the ratio of the left-right distance W and the vertical distance H is 9:16, the image processor 110 may determine that the display apparatus 10 is vertically arranged in the multivision system 1. That is, it may be determined that the display apparatus 10 is rotated 90 degrees or 270 degrees. This arrangement may be called a portrait mode.

Meanwhile, the image processor 110 may also calculate a horizontal length X and a vertical length Y of the bezel located at the edge of the multivision system 1, and ratios thereof. The horizontal/vertical ratio of the bezel located at the edge may be used to determine the ratio of the entire source screen displayed on the multivision system 1.

The setter 120 may generate the video wall setting value for each of the plurality of display apparatuses 10 based on the information determined by the image processor 110. Setting items for the video wall setting may include such items as the entire array, the position of each set, the horizontal/vertical ratio or the landscape/portrait mode of the display apparatus 10 or the entire multivision system 1, screen size (Full/Natural), and a black level of HDMI.

When an overall shape of the multivision system 1 is the square, the entire array may be represented by a two-dimensional matrix, and a position of each set may be represented in the two-dimensional position coordinates indicating the number of rows and columns of the set within the entire matrix.

The setting values for the video wall setting items, that is, the video wall setting values may be generated for each of the plurality of display apparatuses 10, and video wall setting information may include the setting values for the plurality of items.

The communication interface 240 may transmit the video wall setting information for each of the plurality of display apparatuses 10 to the multivision system 1.

Figure 19:
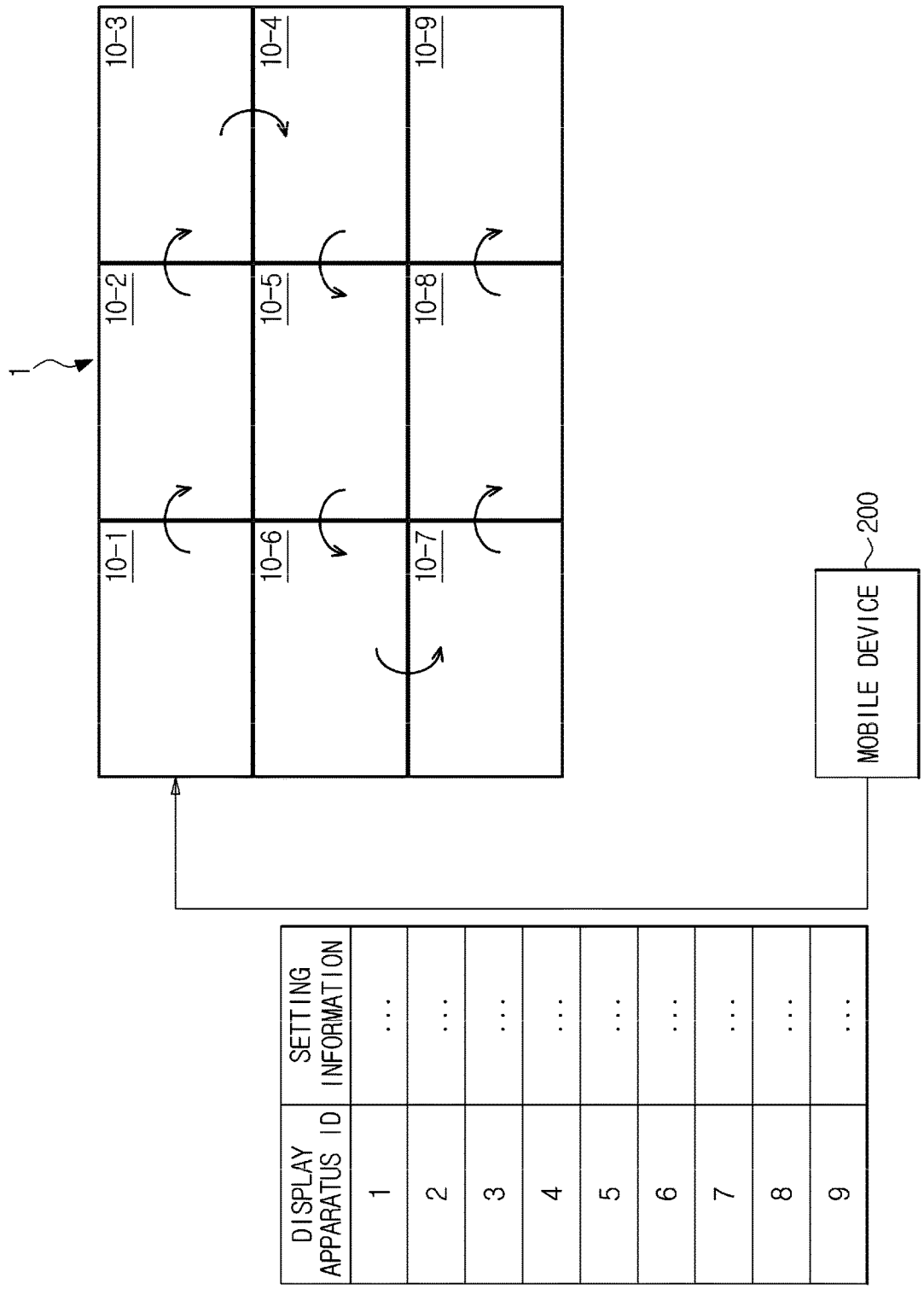
FIGS. 19 and 20 are views illustrating an example in which a mobile device transmits video wall setting information to a multivision system.
Figure 20:
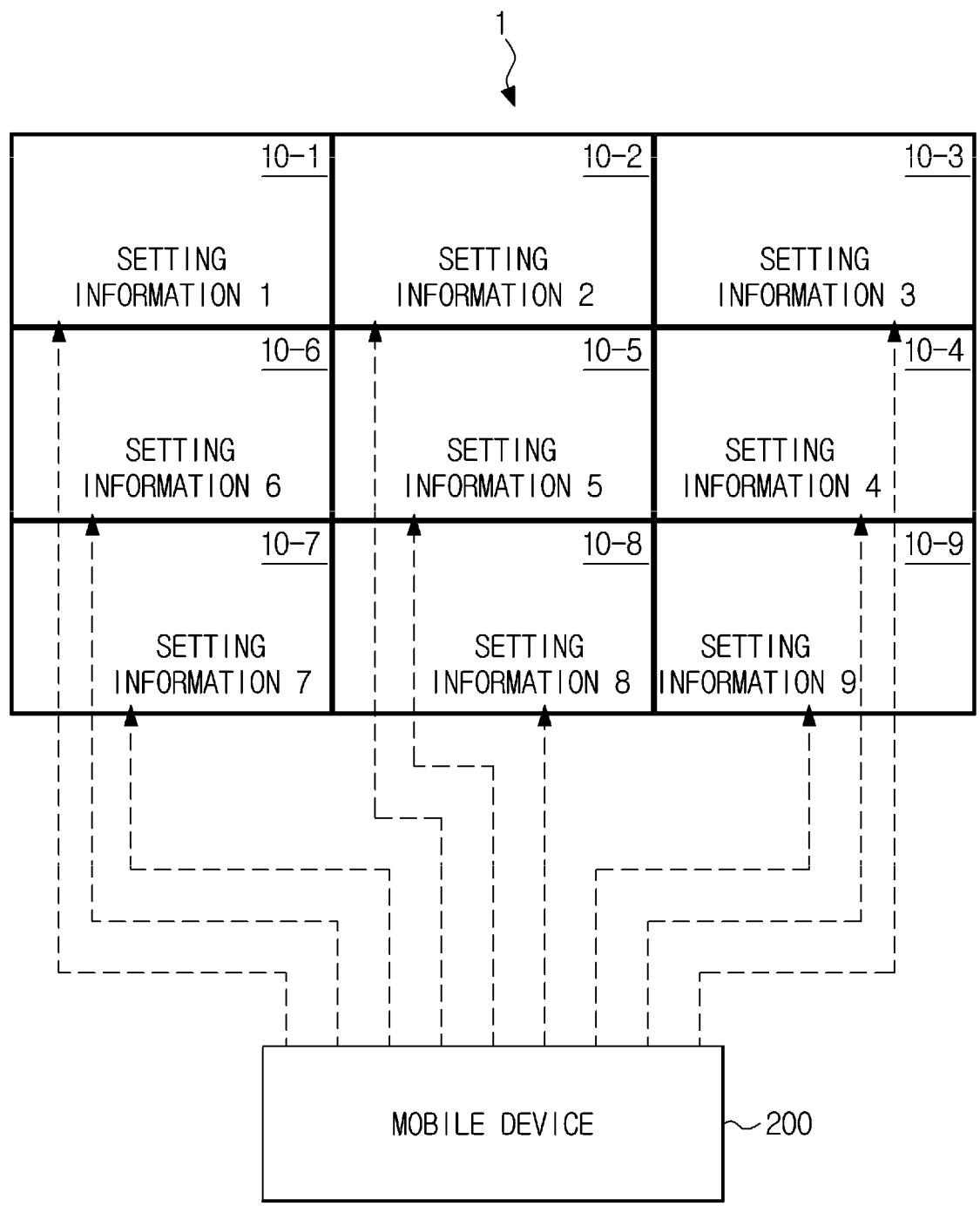

FIGS. 19 and 20 are views illustrating an example in which a mobile device transmits video wall setting information to a multivision system.

The plurality of display apparatuses 10 constituting the multivision system 1 may be connected to each other by wire or wirelessly. For wired connection, a coaxial cable, a LAN cable or a RS-232 cable may be used.

As an example, as illustrated in FIG. 19, the plurality of display apparatuses 10-1 to 10-9 may be connected in order according to the daisy-chain method. At this time, a display apparatus 1 10-1 with the ID 1 may be a master apparatus, and the remaining display apparatuses 10-2 to 10-9 may be slave apparatuses.

The master apparatus may communicate with the mobile device 200. The communication between the mobile device 200 and the master apparatus may also be possible for both wireless communication and wired communication.

When the electronic apparatus 100 provided in the mobile device 200 generates the video wall setting information for each of the plurality of display apparatuses 10-1 to 10-9, the communication interface 240 of the mobile device 200 may transmit the video wall setting information (hereinafter referred to as 'entire video wall setting information') for the entirety of the display apparatuses 10-1 to 10-9 to the master apparatus 10-1 of the multivision system 1. At this time, the video wall setting information for each of the display apparatuses 10 may be transmitted by matching the ID of the corresponding display apparatus 10.

When the entire video wall setting information is received from the mobile device 200, the master apparatus 10-1 may store the video wall setting information matched to its ID, and may automatically perform the video wall setting using the stored video wall setting information.

The master apparatus 10-1 may transmit the entire video wall setting information to a display apparatus 2 10-2 connected to the master apparatus 10-1. The display apparatus 2 10-2 may similarly store the video wall setting information matched to its ID and automatically perform the video wall setting using the stored video wall setting information.

The display apparatus 2 10-2 may transmit the entire video wall setting information to a display apparatus 3 10-3 after being connected to the display apparatus 2 10-2. When the entire video wall setting information is transmitted to a last display apparatus 9 10-9 in the same manner, the video wall setting for the plurality of display apparatuses 10-1 to 10-9 constituting the multivision system 1 may be completed.

Alternatively, when all of the plurality of display apparatuses 10-1 to 10-9 constituting the multivision system 1 are capable of individual wireless communication, as illustrated in FIG. 20, the mobile device 200 may transmit the video wall setting information of the corresponding display apparatus 10 for each of the display apparatuses 10.

Particularly, the communication interface 240 of the mobile device 200 may transmit the video wall setting information (setting information 1) of a display apparatus 1 to the display apparatus 1 10-1, and may transmit the video wall setting information (setting information 2) of a display apparatus 2 to the display apparatus 2 10-2. In the same way, the video wall setting information may be transmitted to the display apparatus 9 10-9. However, even when the plurality of display apparatuses can perform the wireless communication, it is of course possible to transmit the entire video wall setting information to each of the display apparatuses.

As mentioned above, the electronic apparatus 100 may be provided in the multivision system 1. In this case, the electronic apparatus 100 may be provided on one of the plurality of display apparatuses 10 constituting the multivision system 1. The electronic apparatus 100 may be provided on the master apparatus among the plurality of display apparatuses 10, but the embodiment of the electronic apparatus 100 is not limited thereto, and the electronic apparatus 100 may also be provided on the slave apparatus rather than the master apparatus.

Figure 21:
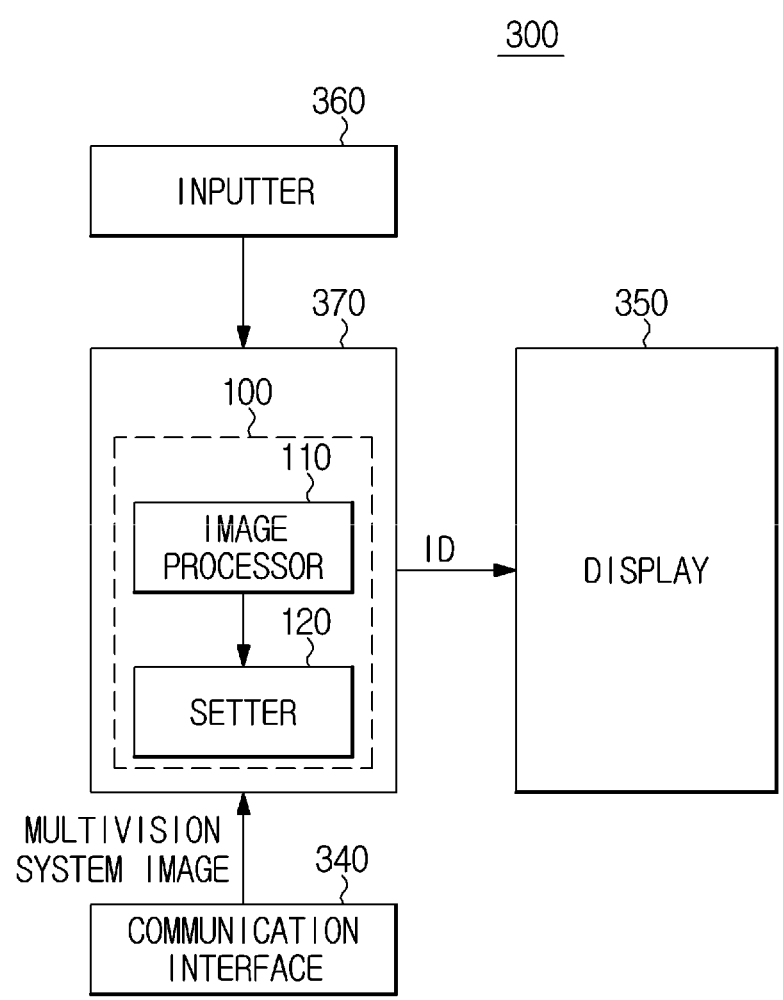
FIG. 21 is a control block diagram of a display apparatus including an electronic apparatus.

FIG. 21 is a control block diagram of a display apparatus including an electronic apparatus.

Referring to FIG. 21, a display apparatus 300 may include a display 350 that displays its ID, a communication interface 340 that receives the multivision system image captured from the outside, the electronic apparatus 100 that determines the positions of the plurality of display apparatuses constituting the multivision system 1 by analyzing the received image and generates the video wall setting value for each of the display apparatuses based on the determined position, and an inputter 360 that receives the user command.

The display apparatus 300 is one of the plurality of display apparatuses 10 constituting the multivision system 1 described above, and may be applied to the display apparatus 300 except for receiving the video wall setting information from the mobile device 200 among the contents related to the display apparatus 10 described above.

The communication interface 340 may include at least one of the wireless communication module and the short-range communication module that can communicate with an external device to exchange data. The description of the wireless communication module and the short-range communication module is the same as the description of the communication interface 240 of the mobile device 200, and thus is omitted.

The communication interface 340 may receive the multivision system image captured by the external device through the wireless communication module or the short-range communication module. Alternatively, it is also possible to receive the multivision system image through the wired connection with the external device.

When the display apparatus 300 is wirelessly connected to the other display apparatuses 10 constituting the multivision system 1, the display apparatus 300 may communicate with the other display apparatuses 10 using the aforementioned wireless communication module or the short-range communication module.

When the display apparatus 300 is connected to the other display apparatuses 10 constituting the multivision system 1 by wire, the communication interface 340 may further include a set communication module. The set communication module may include a coaxial cable port, a LAN port, or an RS232 port, and may be connected to the adjacent display apparatus 10 by the coaxial cable, the LAN cable, or the RS232 cable.

The display 350 may include one of displays such as the liquid crystal display (LCD), the light emitting diode (LED), the organic light emitting diode (OLED), the plasma display panel (PDP), and the cathode ray tube (CRT).

The inputter 360 may include the button, the touch pad, or the combination thereof.

The operation of the electronic apparatus 100 in the display apparatus 300 may be performed by executing the application installed in the display apparatus 300. The application that performs the operation of the electronic apparatus 100 may be the embedded application basically installed in the display apparatus 300, or the third-party application provided from the external recording medium. In the latter case, as described in the previous embodiment of the mobile device 200, the video wall setting program may be downloaded from the external recording medium.

The display apparatus 300 may include a controller 370 that controls the overall operation of the display apparatus 300, and the controller 370 may include the electronic apparatus 100. The processor and the memory for performing the operation of the electronic apparatus 100 may be provided separately from the processor and the memory for performing basic operations of the display apparatus 300, for example, ID assignment, the video wall setting using the video wall setting value, image processing for displaying the source screen, etc., or may be shared with each other.

When the power of the display apparatus 300 is turned on and the user operates the menu for the video wall setting by operating the inputter 360, the controller 370 may perform the ID assignment to distinguish itself from the other display apparatuses 10 in the multivision system 1. For example, the ID assignment may be performed in the daisy-chain method. Since the contents of the ID assignment have been described above, the description will be omitted here.

The display 350 may display the ID assigned to itself. The ID may be assigned to a form that can be distinguished from each other, such as numbers and letters, and can indicate the order.

The display 350 may improve the ID recognition rate in the image processor 110 by displaying its ID in the center of the screen and displaying the background screen and the ID in a different color. In addition, both the ID and the background screen are displayed in the different color from a bezel color of the display apparatus 300, thereby improving the recognition rate of the pattern formed by the bezel.

When the IDs are displayed on the display apparatus 300 as well as the other display apparatuses 10 included in the multivision system 1, the user may take the multivision system image using the external device including the camera, and the captured multivision system image may be transmitted to the communication interface 340 of the display apparatus 300.

The controller 370 of the display apparatus 300 may perform the operation of the electronic apparatus 100 described above using the transmitted multivision system image.

When the controller 370 generates the video wall setting information for each of the plurality of display apparatuses, the communication interface 340 may transmit the generated video wall setting information to the other display apparatuses 10.

When the display apparatus 300 is the master apparatus and the plurality of display apparatuses included in the multivision system 1 are connected by wire, the entire video wall setting information may be transmitted to the next display apparatus 10 according to the method described in FIG. 19 above.

In addition, when the plurality of display apparatuses 10 included in the multivision system 1 is capable of individual wireless communication, by applying the method described above with reference to FIG. 20, the video wall setting information matched to the ID of the corresponding display apparatus 10 may be transmitted to each of the other display apparatuses 10. However, in this case, it is of course possible to transmit the entire video wall setting information.

Hereinafter, a multivision setting method according to the embodiment will be described. The electronic apparatus 100 may be used to perform the multivision setting method according to the embodiment, and the electronic apparatus 100 may be provided in the mobile device 200 or may be provided in the display apparatus 300. The contents described with reference to FIGS. 1 to 21 may be applied to the multivision setting method even if there is no special mention.

Figure 22:
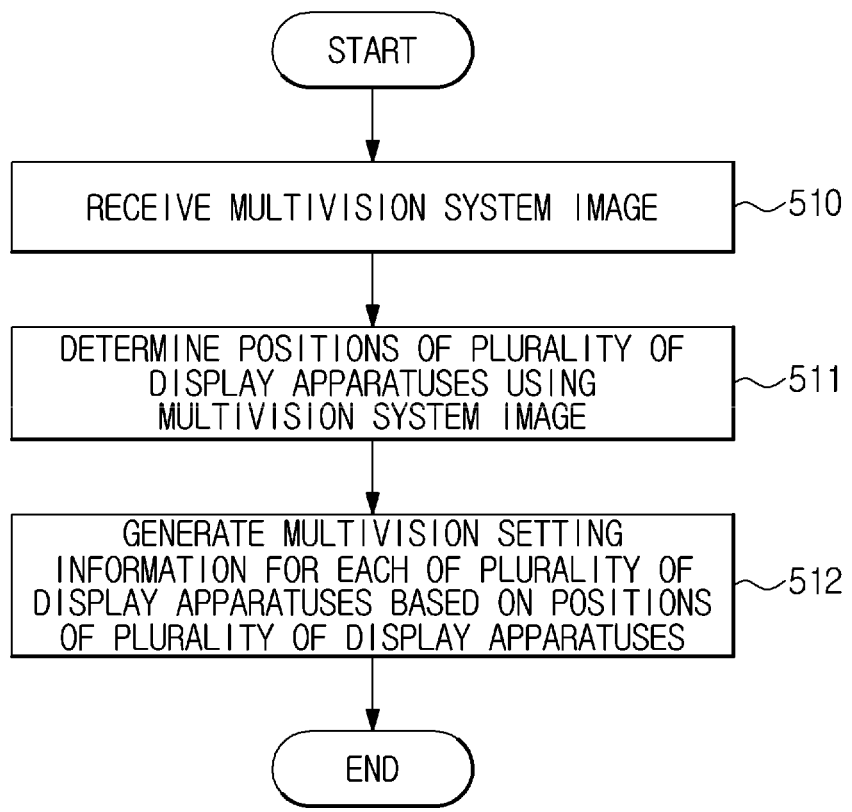
FIGS. 22 and 23 are flowcharts of a multivision setting method according to an embodiment.
Figure 23:
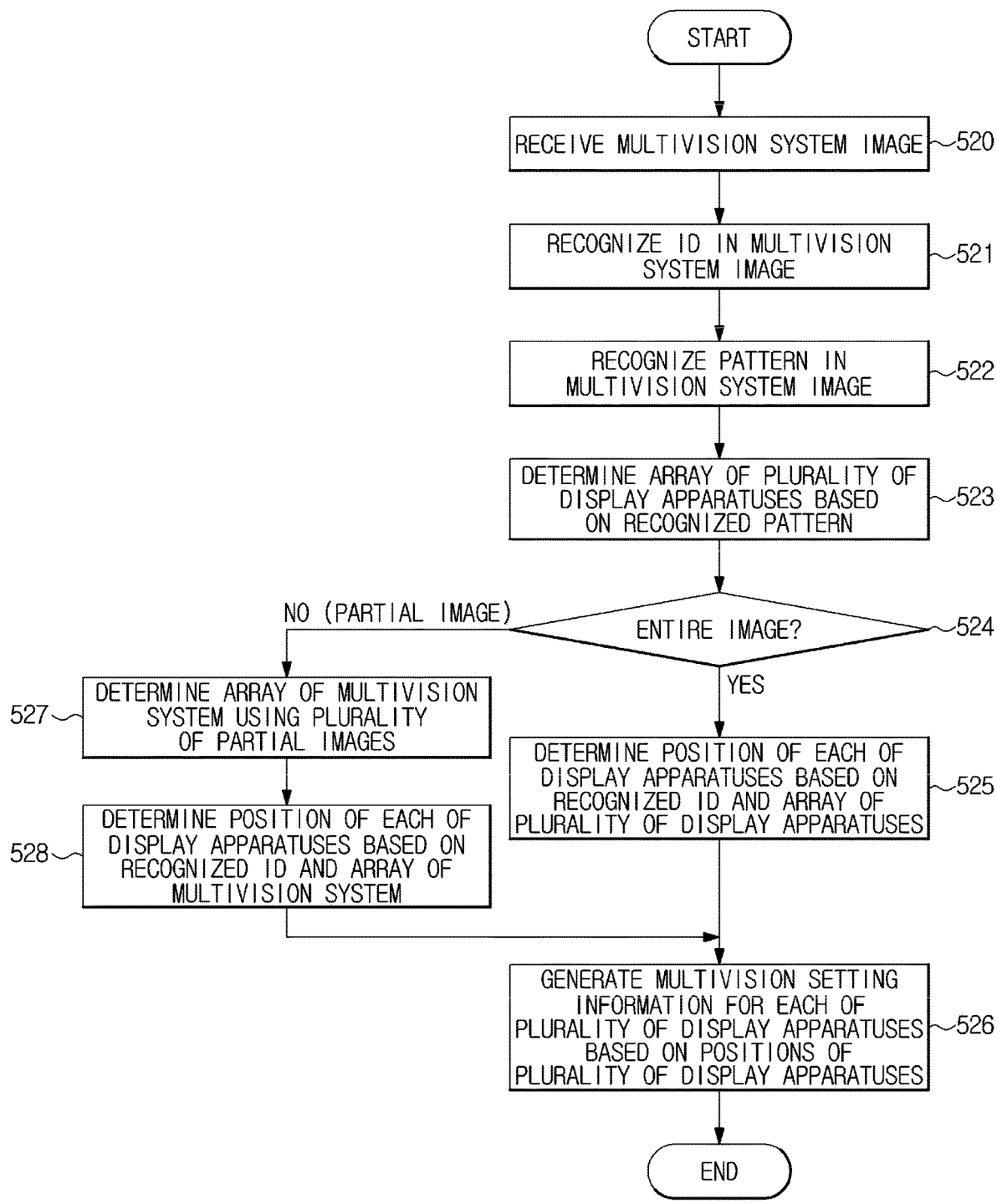

FIGS. 22 and 23 are flowcharts of a multivision setting method according to an embodiment.

Referring to FIG. 22, the multivision system image may be received (510). The multivision system image may be captured by the camera. When the multivision setting method is performed by the mobile device 200, the camera provided in the mobile device 200 may capture the multivision system image and transmit the multivision system image to the controller 270 or the image processor 110. When the multivision setting method is performed by the display apparatus 300, the multivision system image captured by an external camera may be transmitted to the display apparatus 300.

The positions of the plurality of display apparatuses 10 may be determined using the multivision system image (511), and the multivision setting information for each of the plurality of display apparatuses 10 may be generated based on the positions of the plurality of display apparatuses (512).

Referring to FIG. 23 in detail, the image processor 110 may receive the multivision system image (520) and recognize the ID in the multivision system image (521). The ID may be displayed as the numbers or the letters.

The image processor 110 may recognize the pattern in the multivision system image (522). Here, the pattern is a pattern formed by the bezel of the plurality of display apparatuses 10, and types of the recognized pattern is as described in the tables of FIGS. 7 and 8 above.

The array of the plurality of display apparatuses 10 may be determined based on the recognized pattern (523). The image processor 110 may store the rules (see FIGS. 7 and 8) for determining the array of the plurality of display apparatuses 10 according to the types of the patterns and the number of the patterns, and may determine the array of the display apparatuses 10 using the stored rules.

When the multivision system image is the entire image (YES in 524), the position of each of the display apparatuses 10 may be determined based on the recognized ID and the array of the plurality of display apparatuses (525). As an example, the image processor 110 may determine that it is the entire image when all four predefined edge patterns are recognized in the multivision system image, as described above with reference to FIG. 7. When the multivision system image is the entire image, the image processor 110 may determine the array determined using the multivision system image as the array of the multivision system.

When the multivision system image is the partial image rather than the entire image (NO in 524), the array of the multivision system 1 may be determined using the plurality of partial images (527). At this time, the image processor 110 may determine the array of the multivision system 1 from the plurality of partial images according to the contents described with reference to FIGS. 8 to 15 above.

The position of each of the display apparatuses 10 may be determined based on the recognized ID and the array of the multivision system 1 (528).

When the position of each of the display apparatuses 10 is determined, the setter 120 may generate the video wall setting information for each of the plurality of display apparatuses 10 based on the positions of the plurality of display apparatuses 10 (526).

When the multivision setting method is performed by the mobile device 200, the video wall setting information may be transmitted to the multivision system 1. When the plurality of display apparatuses 10 constituting the multivision system 1 are connected to each other by wire and only the master apparatus can perform wireless communication with the mobile device 200, the contents described in FIG. 19 may be applied. When the plurality of display apparatuses 10 can individually perform the wireless communication, the contents described with reference to FIG. 20 may be applied.

When the multivision setting method is performed by the display apparatus 300, the display apparatus 300 may transmit the video wall setting information to the other display apparatus 10.

According to the embodiments of the electronic apparatus, the display apparatus, and the multivision setting method described above, it is possible to reduce the user's work load and work time by analyzing the multivision system image and generating the video wall setting information required to operate each of the display apparatuses in the video wall mode, and automatically inputting the video wall setting information to each of the display apparatuses.

While the present disclosure has been particularly described with reference to exemplary embodiments, it should be understood by those skilled in the art that various changes in form and details may be made without departing from the spirit and scope of the present disclosure.

The invention claimed is:

1. An electronic apparatus comprising:
   at least one processor; and
   at least one memory storing instructions that when executed by the at least one processor, cause the at least one processor to:
   recognize each of IDs displayed on a plurality of display apparatuses in an image in which the plurality of display apparatuses displaying the respective IDs are captured and determine an array of the plurality of display apparatuses;
   determine positions of the plurality of display apparatuses based on the recognized respective IDs and the determined array of the plurality of display apparatuses; and
   generate video wall setting information for each of the plurality of display apparatuses based on the determined positions of the plurality of display apparatuses,
   wherein the at least one processor is configured to recognize a pattern formed by bezels of the plurality of display apparatuses in the captured image, and to determine the array of the plurality of display apparatuses using the recognized pattern.

2. The electronic apparatus according to claim 1, wherein the at least one processor is configured to determine an array of a multivision system including the plurality of display apparatuses based on the determined array of the plurality of display apparatuses.

3. The electronic apparatus according to claim 2, wherein, when the captured image is an entire image including all of the plurality of display apparatuses constituting the multivision system, the at least one processor is configured to determine the array of the plurality of display apparatuses as the array of the multivision system.

4. The electronic apparatus according to claim 2, wherein, when the captured image is a partial image including a part of the plurality of display apparatuses constituting the multivision system, the at least one processor is configured to determine the array of the multivision system using a plurality of the partial images.

5. The electronic apparatus according to claim 2, wherein the at least one processor is configured to determine a ratio between horizontal and vertical sides of the multivision system in the captured image.

6. The electronic apparatus according to claim 1, wherein the at least one processor is configured to determine the array of the plurality of display apparatuses according to a type of the pattern and a number of each type of the pattern.

7. The electronic apparatus according to claim 1, wherein the at least one processor is configured to determine a ratio between horizontal and vertical sides of the plurality of display apparatuses based on a distance between the recognized IDs.

8. A display apparatus included in a multivision system comprising:
   a display configured to display an ID;
   a communication interface configured to receive a multivision system image captured from the outside; and
   a controller configured to:
   recognize each of the IDs displayed on a plurality of display apparatuses constituting the multivision system in the multivision system image and determine an array of the plurality of display apparatuses,
   determine positions of the plurality of display apparatuses based on the recognized respective IDs and the determined array of the plurality of display apparatuses, and
   generate video wall setting information for each of the plurality of display apparatuses based on the determined positions of the plurality of display apparatuses,
   wherein the controller is configured to recognize a pattern formed by bezels of the plurality of display apparatuses in the captured image, and to determine the array of the plurality of display apparatuses using the recognized pattern.

9. The display apparatus according to claim 8, wherein the display is configured to display a color of the ID differently from a color of a background screen.

10. The display apparatus according to claim 8, wherein the display is configured to display a color of the ID in a color different from a bezel of the display apparatus, and to display a color of a background screen in the color different from the bezel of the display apparatus.

11. The display apparatus according to claim 8, wherein the controller is configured to determine an array of the multivision system based on the determined array of the plurality of display apparatuses.

12. The display apparatus according to claim 11, wherein, when the multivision system image is an entire image including all of the plurality of display apparatuses constituting the multivision system, the controller is configured to determine the array of the plurality of display apparatuses as the array of the multivision system.

13. A multivision setting method comprising:
recognizing, by at least one processor, each of IDs displayed on a plurality of display apparatuses in an image in which the plurality of display apparatuses displaying the respective IDs are captured and determine an array of the plurality of display apparatuses;
determining, by the at least one processor, positions of the plurality of display apparatuses based on the recognized respective IDs and the determined array of the plurality of display apparatuses; and
generating, by the at least one processor, video wall setting information for each of the plurality of display apparatuses based on the determined positions of the plurality of display apparatuses,
wherein the at least one processor is configured to recognize a pattern formed by bezels of the plurality of display apparatuses in the captured image, and to determine the array of the plurality of display apparatuses using the recognized pattern.

14. The multivision setting method according to claim 13, wherein the determining of the positions of the plurality of display apparatuses comprises:
determining the array of the plurality of display apparatuses included in the captured image; and
determining an array of a multivision system including the plurality of display apparatuses based on the array of the plurality of display apparatuses.

* * * * *